(12) United States Patent
Bruneau et al.

(10) Patent No.: US 12,466,517 B2
(45) Date of Patent: Nov. 11, 2025

(54) ELECTRIC VEHICLE WITH BATTERY PACK AS STRUCTURAL ELEMENT

(71) Applicant: Taiga Motors Inc., Lasalle (CA)

(72) Inventors: Samuel Bruneau, Montreal (CA); Matthew Schroeder, Montreal (CA); Paul Achard, Montreal (CA); Marc-André Fafard, Montreal (CA)

(73) Assignee: Taiga Motors Inc., Lasalle (CA)

( * ) Notice: Subject to any disclaimer, the term of this patent is extended or adjusted under 35 U.S.C. 154(b) by 932 days.

(21) Appl. No.: 17/569,803

(22) Filed: Jan. 6, 2022

(65) Prior Publication Data

US 2022/0219782 A1    Jul. 14, 2022

Related U.S. Application Data

(60) Provisional application No. 63/135,506, filed on Jan. 8, 2021, provisional application No. 63/135,499, filed
(Continued)

(30) Foreign Application Priority Data

Mar. 30, 2021   (CA) ................................ CA 3113789

(51) Int. Cl.
   *B62M 27/02*      (2006.01)
   *B60K 1/04*       (2019.01)
   (Continued)

(52) U.S. Cl.
   CPC .............. *B62M 27/02* (2013.01); *B60K 1/04* (2013.01); *B62J 1/28* (2013.01); *B62J 43/10* (2020.02);
   (Continued)

(58) Field of Classification Search
   CPC ............ B62M 27/02; B62M 2027/023; B62M 2027/025; B62M 2027/026;
   (Continued)

(56) References Cited

U.S. PATENT DOCUMENTS

| 9,016,080 B2 | 4/2015 | Brodie et al. |
| 9,533,544 B2 | 1/2017 | Johnston |

(Continued)

FOREIGN PATENT DOCUMENTS

| WO | 2021/084520 | 5/2021 |

OTHER PUBLICATIONS

Per Trostemo, "The First Electric Snowmobile", Green Solutions from Sweden, pp. 100-101, Nov. 18, 2015.
(Continued)

*Primary Examiner* — Alentin Neacsu
*Assistant Examiner* — Marlon A Arce
(74) *Attorney, Agent, or Firm* — Dicke, Billig & Czaja, PLLC

(57) ABSTRACT

An electric vehicle and a powertrain for an electric vehicle are disclosed. According to an embodiment, an electric vehicle includes a suspension system, a seat, a steering system, an electric motor and a battery pack. The battery pack includes one or more battery modules to provide power to the electric motor and a battery enclosure housing the one or more battery modules. The battery enclosure is a structural element of the electric vehicle to receive loads from at least two of the suspension system, the seat and the steering system.

19 Claims, 24 Drawing Sheets

Related U.S. Application Data on Jan. 8, 2021, provisional application No. 63/135,497, filed on Jan. 8, 2021.

(51) Int. Cl.
  *B62J 1/28* (2006.01)
  *B62J 43/10* (2020.01)
  *B62K 21/00* (2006.01)
  *H01M 50/249* (2021.01)

(52) U.S. Cl.
  CPC ............ *B62K 21/00* (2013.01); *H01M 50/249* (2021.01); *B60K 2001/0416* (2013.01); *B62M 2027/023* (2013.01); *B62M 2027/025* (2013.01); *B62M 2027/026* (2013.01); *B62M 2027/027* (2013.01); *B62M 2027/028* (2013.01)

(58) Field of Classification Search
  CPC ...... B62M 2027/027; B62M 2027/028; B60K 1/04; B60K 2001/0416; B60K 1/00; B62J 1/28; B62J 43/10; B62K 21/00; H01M 50/249; H01M 2220/20; B60Y 2200/252
  See application file for complete search history.

(56) References Cited

U.S. PATENT DOCUMENTS

| | | | | |
|---|---|---|---|---|
| 10,173,512 | B1* | 1/2019 | Huang | B60L 50/66 |
| 11,731,734 | B2* | 8/2023 | Matsushita | B60L 50/60 |
| | | | | 180/190 |
| 2010/0025006 | A1 | 2/2010 | Zhou | |
| 2016/0276638 | A1* | 9/2016 | Sham | H01M 50/249 |
| 2020/0140037 | A1 | 5/2020 | Haavikko et al. | |
| 2022/0009589 | A1 | 1/2022 | Matsushita | |
| 2022/0017181 | A1 | 1/2022 | Suzuki et al. | |
| 2022/0063764 | A1 | 3/2022 | Matsushita | |
| 2022/0111929 | A1 | 4/2022 | Matsushita | |
| 2022/0219784 | A1* | 7/2022 | Bruneau | B60K 1/04 |
| 2022/0227459 | A1* | 7/2022 | Kauppinen | B62K 3/002 |
| 2022/0411018 | A1* | 12/2022 | Vaisanen | B60W 10/08 |
| 2023/0081226 | A1* | 3/2023 | Connors | B60K 1/04 |
| | | | | 180/68.5 |

OTHER PUBLICATIONS https://www.youtube.com/watch?v=rI8TY5DQk_4, published Apr. 23, 2010.

Mathew Brown, et al., "Review of Zero-Emission Utah State Snowmobile", Utah State University Electric Snowmobile Team, 13 pgs., Mar. 2007.

Marcia Goodrich, "Clean Snowmobile Challenge on Track for March", Published Jan. 24, 2012, https://www.mtu.edu/news/stories/2012/january/clean-snowmobile-challenge-track-for-march.html.

Snowbird: "Austrian Electric Snowmobile Reaches 120kph", Technologi Vehicles, Mar. 3, 2013. https://technologicvehicles.com/en/green-transportation-news/2340/snowbird-cette-motoneige-electrique-autrichie#.YEkIETZYYdU.

"Snowbird", FH-Joanneum University of Applied Sciences, Nov. 2011-Feb. 2013, https://www.fh-joanneum.at/en/projekt/snowbird/.

https://www.youtube.com/watch?v=mLlaLhXoFUs, Snowmobile Spritztour, Published Jan. 25, 2015.

https://www.motoneigeauquebec.com/forum/content.php?518-Motoneige-%E9lectrique-version-Su%E9doise-et-sportive, published Dec. 3, 2013.

https://sverigesradio.se/sida/artikel.aspx?programid=109&artikel=5033462, Soruman, Mar. 24, 2012.

https://www.svt.se/nyheter/lokalt/vasterbotten/el-skotern-ska-satta-storuman-pa-kartan, Jan. 20, 2015.

http://advantage-environment.com/transport/introducing-the-electric-snowmobile/ (accessed via https://web.archive.org/ to obtain properly displayed images), Mar. 2011.

https://newatlas.com/clean-snowmobile-challenge-2011/18121/, Mar. 17, 2011.

www.icatpro.com/electric-snowmobile-icatpro-zero-emission-technology/, Nov. 30, 2017.

https://www.vice.com/en/article/9397m8/the-first-electric-snowmobile-in-the-market-is-a-remarkably-quiet-ride, Apr. 16, 2020.

https://www.youtube.com/watch?v=Z-TbgZvYBpM&ab_channel=dubedubz, Dec. 6, 2016.

https://www.youtube.com/watch?v=ZAYlCbZAFpQ&ab_channel=TaigaMotors, Apr. 15, 2020.

* cited by examiner

ELECTRIC VEHICLE WITH BATTERY PACK AS STRUCTURAL ELEMENT

CROSS-REFERENCE TO RELATED APPLICATIONS

This application claims priority from U.S. Provisional Patent Application No. 63/135,497, filed Jan. 8, 2021, from U.S. Provisional Patent Application No. 63/135,499, filed Jan. 8, 2021, from U.S. Provisional Patent Application No. 63/135,506, filed Jan. 8, 2021, and from Canadian Patent Application No. 3,113,789, filed Mar. 30, 2021, all of which are incorporated by reference in their entirety herein.

TECHNICAL FIELD

The present disclosure relates generally to electric vehicles and, in particular embodiments, to powertrain components of electric vehicles.

BACKGROUND

Electric vehicles comprise different powertrain components than traditional combustion engine vehicles. For example, instead of having a fuel tank and a combustion engine, an electric vehicle comprises a battery pack and an electric motor. Due to the sizes and weights of the electric vehicle powertrain components, consideration is needed when locating and positioning them in relation to each other, as well as other components of the electric vehicle. The strength and rigidity of the electric vehicle should also be considered when locating and positioning the powertrain components.

By way of example, for an electric snowmobile, further consideration is needed when locating a battery pack and electric motor in relation to a chassis and suspension system.

SUMMARY

Some embodiments of the present disclosure provide a battery pack that is configured and implemented as a structural element in an electric vehicle. For example, the battery enclosure of the battery pack may serve at least two functions in the electric vehicle. The first function is protecting and/or encapsulating other battery components, such as one or more battery cells, one or more battery modules and/or one or more battery controllers, for example. The second function is providing strength and rigidity to the electric vehicle by receiving loads from the suspension system, seat and/or steering system, for example. In this way, the battery pack may reduce the number, size and/or weight of other structural components in the electric vehicle, and increase the overall structural efficiency of the electric vehicle.

According to one example, an electric vehicle is provided that comprises a suspension system, a seat, a steering system, an electric motor and a battery pack. The battery pack may comprise one or more battery modules to provide power to the electric motor and a battery enclosure may house the one or more battery modules. The battery enclosure is a structural element of the electric vehicle to receive loads from at least two of the suspension system, the seat and the steering system of the electric vehicle.

In some examples, the battery enclosure transfers the loads received, at least partially, to a center of mass of the electric vehicle. Alternatively or additionally, the battery enclosure transfers the received loads, at least partially, to a chassis of the electric vehicle. According to another example, the battery enclosure defines a front portion and a rear portion. The front portion may receive loads from at least one of the suspension system (e.g., a front suspension of the electric vehicle) and the steering system. The rear portion may receive loads from at least the seat.

In some examples, the electric vehicle comprises a chassis defining a front brace structure, the battery enclosure connected to the front brace structure to receive loads from the front brace structure. Optionally, multiple different surfaces of the battery enclosure (e.g., front, top, side and/or bottom surfaces) are connected to the front brace structure. The suspension assembly may include a shock absorber that is connected to the front brace structure.

In some examples, the battery enclosure is connected to the steering system to receive loads from the steering system.

In some examples, the electric vehicle is a snowmobile.

According to one example, a battery enclosure for an electric vehicle is provided. The battery enclosure being a structural element of the electric vehicle and comprising a rear portion for connection to a rear portion of a chassis of the electric vehicle, the rear portion of the battery enclosure configured to receive loads from a seat of the electric vehicle; and a front portion for connection to a front portion of the chassis of the electric vehicle, the front portion of the battery enclosure configured to receive loads from a front suspension of the electric vehicle.

In some examples, the battery enclosure is configured to transfer loads received from the seat and/or the front suspension, at least partially, to a center of mass of the electric vehicle. In some examples, the battery enclosure is configured to transfer loads received from the seat and/or the front suspension, at least partially, to a chassis of the electric vehicle. In some examples, the front portion is to receive loads from a steering system of the electric vehicle and, optionally, to transfer those loads, at least partially, to a center of mass of the electric vehicle.

In some examples, the battery enclosure comprises a carbon fiber composite material. Alternatively or additionally, the battery enclosure comprises a glass fiber reinforced plastic material. The battery enclosure may have a stiffness that is within a range that is equal to or greater than 10 gigapascal (Gpa) and equal to or less than 70 Gpa. In some examples, the battery enclosure houses at least two electric battery modules and, optionally, provides a water-tight housing for the at least two electric battery modules.

In some examples, the electric vehicle is a snowmobile. In some examples, the rear portion of the battery enclosure is adapted for connection to a tunnel of the snowmobile, and the front portion of the battery enclosure is adapted for connection to a front brace structure of the snowmobile.

According to a further example, the battery enclosure transfers the loads received, at least partially, to a center of mass of the electric vehicle. In another example, the battery enclosure transfers the loads received, at least partially, to a chassis of the electric vehicle. According to another example, the battery enclosure defines a front portion and a rear portion, the front portion receiving loads from a front suspension of the electric vehicle. According to another example, the battery enclosure defines a front portion and a rear portion, the front portion receiving loads from the steering system and the rear portion receiving loads from the seat.

According to one example, a snowmobile is provided comprising a chassis that comprises a rear tunnel and a front brace structure adapted to receive loads from a front suspension system of the snowmobile. The snowmobile further comprises a battery enclosure defining a tunnel portion and a front portion, the tunnel portion being connected to the rear tunnel of the chassis and the front portion being connected to the front brace structure of the chassis. The battery enclosure receives loads from the front suspension system of the snowmobile through the front brace structure and transfers the loads from the front suspension system to at least one of the rear tunnel and a center of mass of the electric vehicle through a body of the battery enclosure.

In some examples, the battery enclosure is further connected to the front brace structure at a bottom surface. In some examples, a steering mount is connected to the front portion of the battery enclosure for connection to a steering column, the steering mount transferring loads from the steering column into the body of the battery enclosure. In some examples, a seat is connected to the tunnel portion of the battery enclosure, wherein loads from the seat are received by and transferred into the body of the battery enclosure. In some examples the front portion of the battery enclosure defines a first height and the tunnel portion of the battery enclosure defines a second height, the first height being greater than the second height. In some examples, the front portion of the battery enclosure defines a first width and the tunnel portion of the battery enclosure defines a second width, the first width being greater than the second width. In some examples, the front suspension system comprises at least one coil over spring and damper assembly. In some examples, at least one coil over spring and damper assembly is connected between a pair of skis and the front brace structure. In some examples, the battery enclosure comprises a carbon fiber composite material. In some examples, the battery enclosure comprises an injection molded glass fiber reinforced plastic material. In some examples, the tunnel portion of the battery enclosure is connected to the rear tunnel of the chassis via two or more right side blocks and two or more left side blocks. In some examples, the battery enclosure has a stiffness that is within a range that is equal to or greater than 10 Gpa and equal to or less than 70 Gpa. In some examples, the battery enclosure comprises a cover and a floor. In some examples the battery enclosure houses at least two electric battery modules for supplying electricity to the electric motor. In some examples, the battery modules comprise one or more pouch battery cells.

According to one example, a battery enclosure for an electric snowmobile is provided. The battery enclosure comprises a tunnel portion adapted for connection to a rear tunnel of a snowmobile chassis, a front portion adapted for connection to a front brace structure of the snowmobile chassis. The battery enclosure is configured to receive loads from a front suspension system of the snowmobile through the front brace structure and transfers the loads from the front suspension system to at least one of the rear tunnel and a center of mass of the electric vehicle through a body of the battery enclosure.

In one example, the battery enclosure is configured for connection to a steering column via a steering mount for receiving loads from the steering column into the body of the battery enclosure. In some examples, the battery enclosure is configured for connection to a seat of the electric vehicle for receiving loads from the seat into the body of the battery enclosure. In some examples, the front portion of the battery enclosure defines a first height and the tunnel portion of the battery enclosure defines a second height, the first height being greater than the second height. In some examples, the front portion of the battery enclosure defines a first width and the tunnel portion of the battery enclosure defines a second width, the first width being greater than the second width. In some examples, the battery enclosure comprises a carbon fiber composite material. In some examples, the battery enclosure comprises an injection molded glass fiber reinforced plastic material. In some examples, the battery enclosure has a stiffness that is within a range that is equal to or greater than 10 gigapascal (Gpa) and equal to or less than 70 Gpa. In some examples, the battery enclosure comprises a cover and a floor.

According to one example, an electric vehicle is provided that comprises a straddle-seat, a chassis, a suspension system and a battery pack configured as a structural element that receives loads from the suspension system. In one example, the battery pack comprising a battery enclosure coupled to the suspension system to transfer, at least partially, loads from the suspension system through a body of the battery enclosure to the chassis. In one example, a brace structure transfers loads between the suspension system and the battery enclosure. In one example, the straddle-seat is mounted directly to the battery pack. In one example, the electric vehicle is a snowmobile.

Some embodiments of the present disclosure provide a battery pack that defines a slot to accommodate and receive a steering column of the electric vehicle. In this way, the steering column can extend through the battery pack. Optionally, the slot may be provided in a battery enclosure of the battery pack. The steering column may connect handlebars of the electric vehicle to one or more steering arms, which allows the electric vehicle to be steered and controlled. Advantageously, the slot may allow the steering column to be substantially straight, rather than be bent to avoid the battery pack. A straight steering column may be stronger, easier to manufacturer, and provide a better ride quality than a bent steering column.

One example provides an electric vehicle. The electric vehicle includes a battery pack having a battery enclosure, the battery enclosure defines a slot that extends downwards from a top surface of the battery enclosure for receiving a steering column of the electric vehicle.

In one example, the slot extends downwards from the top surface of the battery enclosure to a front side surface of the battery enclosure. In another example, the slot extends downwards from the top surface of the battery enclosure to a bottom surface of the battery enclosure. In one example, the width of the slot varies along a length, a top end of the slot being wider than a bottom end of the slot.

In one example, the slot divides the front portion of the battery enclosure into a first side and a second side, wherein each of the first side and second side is suitable for housing one or more electric battery modules. In one example, the slot is positioned substantially centrally with respect to a first side wall and a second side wall of the battery enclosure.

In one example, the battery enclosure is a structural component suitable for receiving loads from the steering column and transferring the loads to a chassis. In one example, a straight steering column passes through the slot.

Another example provides a snowmobile. The snowmobile includes a chassis that comprises a rear tunnel, a front brace structure, and a battery enclosure defining a tunnel portion and a front portion, the tunnel portion being connected to the rear tunnel of the chassis and the front portion being connected to the front brace structure, wherein the front portion of the battery enclosure defines a slot that extends downwards from a top surface of the battery enclosure for receiving a steering column of the snowmobile.

In one example, the slot extends downwards from the top surface of the battery enclosure to a front side surface of the battery enclosure. In one example, the slot extends downwards from the top surface of the battery enclosure to a bottom surface of the battery enclosure. In one example, the slot defines a first side wall, a second side wall and a bottom surface, wherein the bottom surface of the slot extends at an angle of between 30-60 degrees with respect to a substantially horizontal longitudinal axis of the snowmobile. In one example, a width of the slot is between 30 millimeters (mm) and 60 mm. In one example, the width of the slot varies along a length, a top end of the slot being wider than a bottom end of the slot.

In one example, the slot divides the front portion of the battery enclosure into a first side and a second side, wherein each of the first side and second side is suitable for housing one or more electric battery modules. In one example, the slot is positioned substantially centrally with respect to a first side wall and a second side wall of the battery enclosure. In one example, the battery enclosure is a structural component suitable for receiving loads from the steering column and transferring the loads to the chassis. In one example, a straight steering column passes through the slot.

In one example, a top of the steering column is above the top surface of the battery enclosure and a bottom of the steering column is below a bottom surface of the battery enclosure and is attached to a steering mechanism that controls a direction of a right front ski and a left front ski for the snowmobile. In one example, an upper steering mount is attached to the top surface of the battery enclosure and is configured to support an upper portion of the steering column and provide a stiffness to the upper portion of the steering column.

In one example, the battery enclosure has a stiffness that is within a range that is equal to or greater than 10 gigapascal (Gpa) and equal to or less than 70 Gpa, and wherein the stiffness of the battery enclosure corresponds with the stiffness that the upper steering mount provides to the upper portion of the steering column.

In one example, the upper steering mount comprises a right upper steering mount and a left upper steering mount attached to a pipe having an axis aligned with an axis of the steering column, and wherein the steering column passes through the pipe and is supported by the pipe. In one example, the steering column passes through the slot at an angle with respect to an axis of the steering column and a substantially horizontal longitudinal axis of the snowmobile that is equal to or greater than 30 degrees and equal to or less than 60 degrees. In one example, the slot is centered between a right side wall and a left side wall of the front portion of the battery enclosure, and wherein a right side stack of one or more batteries are between a first side wall of the slot and a first side wall of the front portion of the battery enclosure, and wherein a left side stack of one or more batteries are between a second side wall of the slot and a second side wall of the front portion of the battery enclosure.

In one example, the front portion of the battery enclosure has a width in a direction transverse to a substantially horizontal longitudinal axis of the snowmobile in a direction between the front end and the back end of the snowmobile that is greater than a width of the tunnel portion of the battery enclosure, and wherein the tunnel portion of the battery enclosure includes a row of one or more batteries aligned along the substantially horizontal longitudinal axis of the snowmobile between the front end and the rear end of the snowmobile.

Another example provides a battery enclosure for an electric vehicle. The batter enclosure includes a rear portion, and a front portion, the front portion of the battery enclosure defining a slot that extends downwards from a top surface of the battery enclosure for receiving a steering column of the electric vehicle.

In one example, the slot extends downwards from the top surface of the battery enclosure to a front side surface of the battery enclosure. In one example, the slot extends downwards from the top surface of the battery enclosure to a bottom surface of the battery enclosure. In one example, the slot defines a first side wall, a second side wall and a bottom surface, wherein the bottom surface of the slot extends at an angle of between 30-60 degrees with respect to a substantially horizontal longitudinal axis of the electric vehicle. In one example, a width of the slot is between 30 millimeters (mm) and 60 mm. In one example, the slot divides the front portion of the battery enclosure into a first side and a second side, wherein each of the first side and second side is suitable for housing electric battery modules. In one example, the slot is positioned substantially centrally with respect to a first side wall and a second side wall of the battery enclosure. In one example, the battery enclosure has a stiffness that is within a range that is equal to or greater than 10 gigapascal (Gpa) and equal to or less than 70 Gpa.

In one example, the tunnel portion of the battery enclosure includes a row of one or more batteries in a direction between the front portion of the battery enclosure and the tunnel portion of the battery enclosure. In one example, the battery enclosure comprises a carbon fiber composite material. In one example, the battery enclosure comprises an injection molded glass fiber reinforced plastic material.

In one example, the electric vehicle is a snowmobile.

According to one example, an electric vehicle is provided that comprises a steering system comprising a steering column and a battery pack comprising a battery enclosure and a plurality of battery modules housed within the battery enclosure, the battery enclosure defining a slot that extends from at least a top surface of the battery enclosure to receive the steering column.

In some examples, the slot is substantially straight and/or a portion of the steering column received by the slot is substantially straight.

In some examples, the slot extends from the top surface of the battery enclosure to a front side surface of the battery enclosure. Alternatively or additionally, the slot extends from the top surface of the battery enclosure to a bottom surface of the battery enclosure.

In some examples, the steering system comprises a handlebar attachment coupled to an upper portion of the steering column. The steering system may also or instead comprise at least one steering arm coupled to a lower portion of the steering column. The electric vehicle may comprise at least one ski assembly coupled to the at least one steering arm.

In some examples, the slot divides a portion of the battery enclosure into a first side and a second side, wherein each of the first side and the second side houses one or more of the plurality of electric battery modules. The slot may be positioned substantially centrally with respect to a first side wall and a second side wall of the battery enclosure. The slot may define a bottom surface, the bottom surface extending at an angle of between 30-60 degrees with respect to a substantially horizontal longitudinal axis of the electric vehicle. A width of the slot may be between 30 millimeters (mm) and 60 mm.

In some examples, the steering system comprises a mount coupled to the top surface of the battery enclosure to support an upper portion of the steering column. The battery enclosure may be a structural component suitable for receiving loads from the steering column and transferring the loads to a chassis of the electric vehicle.

In some examples, the electric vehicle is a straddle-seat vehicle comprising a straddle-seat, such as a snowmobile. The straddle-seat may be coupled to the battery pack.

According one example, an electric snowmobile is provided that comprises a chassis comprising a rear tunnel and a front brace structure; a steering system comprising a steering column; and a battery enclosure defining a tunnel portion and a front portion, the tunnel portion being connected to the rear tunnel of the chassis and the front portion being connected to the front brace structure, wherein the front portion of the battery enclosure defines a slot that extends downwards from a top surface of the battery enclosure for receiving the steering column. The electric snowmobile may also comprise at least one ski assembly connected to the steering system.

According to one example, a battery pack for an electric vehicle is provided that comprises a plurality of battery modules and a battery enclosure housing the plurality of battery module and defining a slot to receive a steering column of the electric vehicle that extends from a top surface of the battery enclosure. The battery enclosure may define a rear portion, a front portion first side and a front portion second side, the front portion first side and the front portion second side being separated by the slot. Each of the rear portion, the front portion first side and the front portion second side may house at least one stack of battery modules.

Some embodiments of the present disclosure provide an electric motor that is positioned and mounted on a chassis of an electric vehicle to provide a space efficient configuration and better manage loads. For example, the electric motor may be positioned within a mid-bay of an electric snowmobile, between a rear tunnel and a front end of the electric snowmobile and below a battery pack. The electric motor may also or instead be adjacent to a front wall of the rear tunnel. This position may place the electric motor in proximity to, and substantially horizontal to, a transmission of the electric snowmobile for space efficiency. Further, a simply supported transmission plate may be used to mount and stabilize the electric motor. The transmission plate may be connected at one end to the rear tunnel and at another end to a front brace structure. These connection points of the transmission plate may be generally aligned with at least some loads exerted by the electric motor and/or the transmission on the transmission plate. In this way, the transmission plate may be configured to better manage the loads without bending and may be lighter than other transmission plates not utilizing such a configuration.

One example provides an electric vehicle. The electric vehicle includes a chassis defining a rear portion and a front portion, a transmission mounted to a rear portion of the chassis, and a battery enclosure mounted on top of the rear portion of the chassis. An electric motor mounted below the battery enclosure and between a front side of the rear chassis and a front end of the electric vehicle.

In one example, the electric motor is oriented generally horizontally relative to the transmission. In one example, the electric vehicle includes a transmission drive shaft and a motor drive shaft spaced apart along a longitudinal axis of the electric vehicle.

In one example, the rear portion of the chassis is a rear tunnel and the front portion of the chassis is a front brace structure, wherein a transmission plate attached to the electric motor is connected at a first end to the rear tunnel and at a second end to the front brace structure. In one example, the electric vehicle is a snowmobile.

Another example provides a snowmobile. The snowmobile includes a chassis that comprises a rear tunnel, a battery enclosure mounted to the rear tunnel, and an electric motor mounted below the battery enclosure and adjacent to a front side of the rear tunnel.

In one example, the chassis further defines a mid-bay and a front brace structure, the mid-bay being located between the rear tunnel and the front brace structure, wherein the electric motor is positioned within the mid-bay. In one example, the mid-bay comprises a transmission plate positioned substantially parallel to a first side edge of the rear tunnel. In one example, transmission plate is attached at a first end to the first side edge of the rear tunnel and at a second end to a component of the front brace structure. In one example, the transmission plate is further attached to a front plate of the electric motor.

In one example, the snowmobile further comprises a transmission, wherein the electric motor is mounted proximate to the transmission by the transmission plate. In one example, the transmission plate includes a U-shaped opening that extends downwards from a top side of the transmission plate, and wherein the electric motor is attached to both sides of the U-shaped opening such that a drive shaft of the electric motor extends through the U-shaped opening. In one example, a component of the front brace structure is mounted to an underside of the battery enclosure and to the transmission plate.

In one example, the electric motor includes an electric motor drive gear and the transmission includes a transmission gear, and wherein a drive belt is connected between the electric motor drive gear and the transmission gear such that an angle of a top portion of the drive belt between the electric motor drive gear and the transmission gear with respect to a substantially horizontal longitudinal axis of the snowmobile is equal to or less than 20% and equal to or greater than −20%. In one example, the snowmobile further includes a drive belt idler pulley that contacts a bottom surface of the bottom portion of the drive belt, and wherein the top portion of the drive belt is connected directly between the electric motor drive gear and the transmission gear.

Another example provides an electric snowmobile. The electric snowmobile includes a transmission mounted within an interior of a rear tunnel of the snowmobile and proximate to a rear suspension of a track of the snowmobile, and a battery enclosure mounted to the rear tunnel. The electric motor is mounted below the battery enclosure and between a front side of the rear tunnel and a front end of the snowmobile.

In one example, a transmission is provided, wherein the electric motor is mounted directly to the transmission by a transmission plate, and wherein the transmission plate is mounted to the rear tunnel of the snowmobile. In one example, the transmission plate includes a U-shaped opening that extends downwards from a top side of the transmission plate, and wherein the electric motor is attached to the transmission plate at an interior of the transmission plate such that a drive shaft of the electric motor extends through from the interior to an exterior of the U-shaped opening of the transmission plate.

In one example, the electric motor includes an electric motor drive gear and the transmission includes a transmission gear, and wherein a drive belt is connected between the electric motor drive gear and the transmission gear such that an angle of a top portion of the drive belt between the electric motor drive gear and the transmission gear with respect to a substantially horizontal longitudinal axis of the snowmobile is equal to or less that 20% and equal to or greater than −20%.

According to one example, an electric vehicle is provided that comprises a chassis comprising a rear portion and a front portion, and a suspension system comprising a front suspension coupled to the front portion of the chassis and a rear suspension coupled to the rear portion of the chassis. A battery pack is mounted at least partially on top of the rear portion of the chassis. An electric motor, powered by the battery pack, is mounted below the battery pack and between the rear portion of the chassis and a front end of the electric vehicle. The electric vehicle may also include a straddle-seat coupled to the battery pack. The electric vehicle may be a snowmobile.

In some examples, the electric vehicle comprises a transmission mounted to the rear portion of the chassis and coupled to the electric motor. The electric motor may be positioned substantially horizontally relative to the transmission. The electric vehicles may include a drive linkage (which is optionally a component of the transmission) to couple the transmission to the electric motor. The drive linkage may comprise a drive belt and/or a drive chain. In some examples, an angle of a portion of the drive linkage extending between the electric motor and the transmission with respect to a substantially horizontal longitudinal axis of the electric vehicle is between 11.3 degrees and −11.3 degrees.

In some examples, the rear portion of the chassis comprises a rear tunnel and the front portion of the chassis comprises a front brace structure and the electric vehicle comprises a transmission plate coupled to the electric motor. A first end of the transmission plate is connected to the rear tunnel and a second end of the transmission plate is connected to the front brace structure. The first end and the second end of the transmission plate may be spaced apart along a substantially horizontal longitudinal axis of the electric vehicle. The transmission plate may comprise a slot extending downwards from a top side of the transmission plate, and a drive shaft of the electric motor extends through the slot of the transmission plate.

According to one example, an electric snowmobile is provided that comprises a chassis comprising a rear tunnel; a battery pack mounted to the rear tunnel; and an electric motor, powered by the battery pack, mounted below the battery pack and adjacent to a front side of the rear tunnel.

In some examples, the chassis comprises a mid-bay and a front brace structure, the mid-bay being located between the rear tunnel and the front brace structure, wherein the electric motor is positioned within the mid-bay. Optionally, the electric vehicle comprises a transmission plate coupled to the electric motor. A first end of the transmission plate may be connected to the rear tunnel and a second end of the transmission plate may be connected to the front brace structure. The first end and the second end of the transmission plate may be spaced apart along a substantially horizontal longitudinal axis of the electric snowmobile. Further, the transmission plate may comprise a slot extending downwards from a top side of the transmission plate, and a drive shaft of the electric motor may extend through the slot of the transmission plate.

In some examples, the electric snowmobile comprises a transmission mounted to the rear tunnel of the chassis and coupled to the electric motor. The electric motor may be positioned substantially horizontally relative to the transmission. A drive linkage may couple the transmission to the electric motor. An angle of a portion of the drive linkage extending between the electric motor and the transmission with respect to a substantially horizontal longitudinal axis of the electric vehicle may be between 11.3 degrees and −11.3 degrees.

According to one example, an electric snowmobile is provided that comprises a chassis comprising a rear tunnel; a transmission mounted within an interior of a rear tunnel; a battery pack mounted to the rear tunnel; and an electric motor, powered by the battery pack, mounted adjacent to a front side of the rear tunnel and substantially horizontally relative to the transmission.

According to one example, an electric vehicle is provided that comprises a straddle-seat, a chassis, and a battery pack coupled to the straddle-seat to passively transfer heat to the straddle-seat. The battery pack may support the straddle-seat to receive loads from the straddle-seat. In some examples, the battery pack comprises a battery enclosure, the straddle-seat is mounted to the battery enclosure, and the battery enclosure is configured to transfer, at least partially, loads from the straddle-seat through a body of the battery enclosure to the chassis. In some examples, the straddle-seat is configured to receive radiant heat generated during discharge of the battery pack. Optionally, the electric vehicle is a snowmobile.

DETAILED DESCRIPTION

In the following detailed description, reference is made to the accompanying drawings which form a part hereof, and in which are shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

The present disclosure relates, in part, to electric vehicles. In one or more examples illustrated herein, an electric vehicle is a powersport vehicle such as an electric snowmobile. It is recognized that although a snowmobile is used in some examples, the present disclosure also applies to other electric vehicles, including other electric powersport vehicles (e.g., electric all-terrain vehicles (ATV), utility task vehicles (UTV), personal watercraft, side-by-side vehicles, motorcycles, etc.). In some examples, the electric vehicle is a straddle-seat electric vehicle, which is a vehicle where the seat is straddled by a rider, such as a snowmobile, personal watercraft or ATV, among others.

In some embodiments, an electric vehicle includes a battery pack that is configured as a structural element. For example, the battery pack may receive loads from a suspension system and/or other components of the electric vehicle during operation of the electric vehicle. Utilizing the battery pack as a structural element results in dynamic advantages in operation of the electric vehicle and an ergonomic advantage to the electric vehicle riders.

Figure 1:
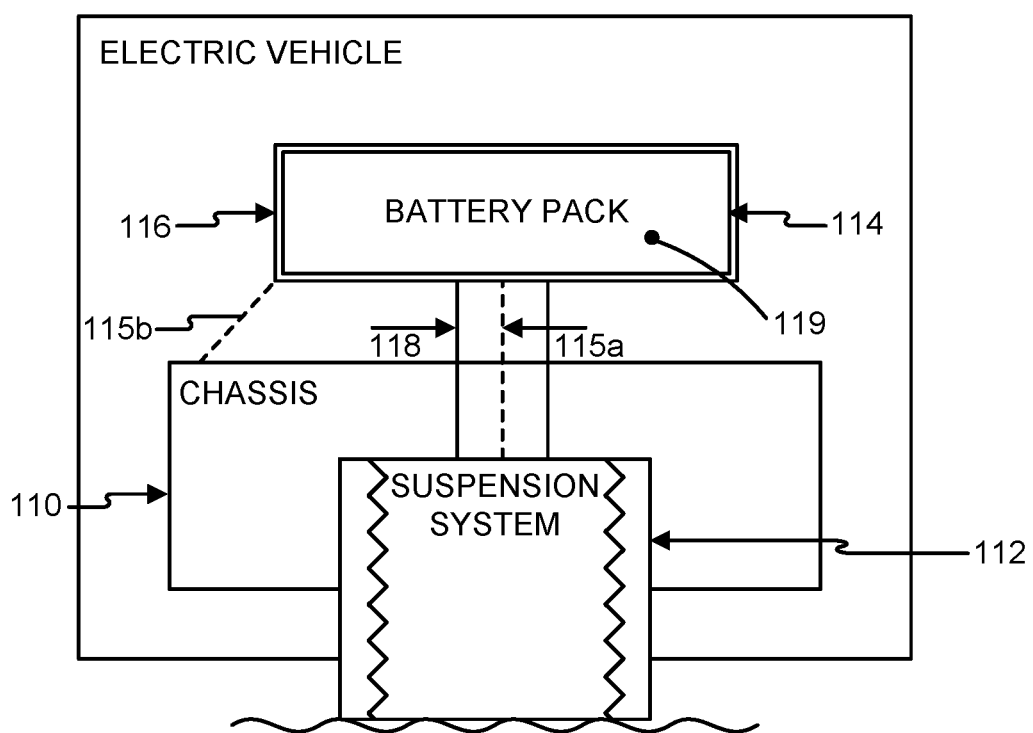
FIG. 1 is a block diagram illustrating components of an electric vehicle, according to one example of the present disclosure.

FIG. 1 is a block diagram illustrating components of an electric vehicle 100 according to one example of the present disclosure. The electric vehicle 100 includes a chassis 110 (or frame), a suspension system 112 and a battery pack 114, among other components that are not shown. The battery pack 114 is configured as a structural element that receives loads from at least the suspension system 112, indicated at 115a, and may transfer loads, at least partially, from the suspension system 112, through the battery pack 114 to the chassis 110, indicated at 115b. As will be described in more detail below, the battery pack 114 may be further configured to receive loads from all or some of the seating of the electric vehicle 100 and a steering column, among other components or mechanisms of the electric vehicle 100, and transfer those loads, at least partially, to the chassis 110.

In some examples, the battery pack 114 may transfer loads to the center of mass (or center of gravity) of the electric vehicle 100. The center of mass (CM) may correspond to a location on or within the chassis 110; however, this need not always be the case. The center of mass may also or instead correspond to other components of the electric vehicle 100 such as the battery pack 114, for example. The transfer of received loads from the battery pack 114 to the center of mass may result from the battery pack 114 being a structural element that adds strength and/or rigidity to the electric vehicle 100. The transfer of load in an electric vehicle may be considered the transfer of inertia from a linear and/or rotational acceleration. By way of example, when the electric vehicle 100 travels over a bump, the suspension system 112 may experience a linear and/or rotational acceleration as the suspension system 112 is forced upwards by the bump. The acceleration may be transferred as a load to the center of mass via the battery pack 114. When the load reaches the center of mass, it may be considered to act on the entire electric vehicle 100, forcing the electric vehicle 100 upwards.

It should be noted that although the battery pack 114 is a structural element of the electric vehicle 100, forces may also be transferred directly from the suspension system 114 to the chassis 110 (or center of mass) without transiting the battery pack 114. For example, the suspension system 112 and the center of mass may be connected via other linkages that can transfer loads. The proportions of loads that are transferred via the battery pack 114 may depend on the rigidity of the battery pack relative to other linkages between the suspension system 112 and the center of mass.

In the illustrated example, the battery pack 114 comprises a battery enclosure 116 housing one or more battery modules 119. The battery enclosure 116 may protect the battery module 119 from external impacts, water and/or other debris. In one example, it is the battery enclosure 116 that is coupled to the suspension system 112 for receiving and transferring loads between the other vehicle components. A brace structure 118 that forms part of the chassis 110 may be present to transfer loads between the battery enclosure 116 and the suspension system 112.

Figure 2:
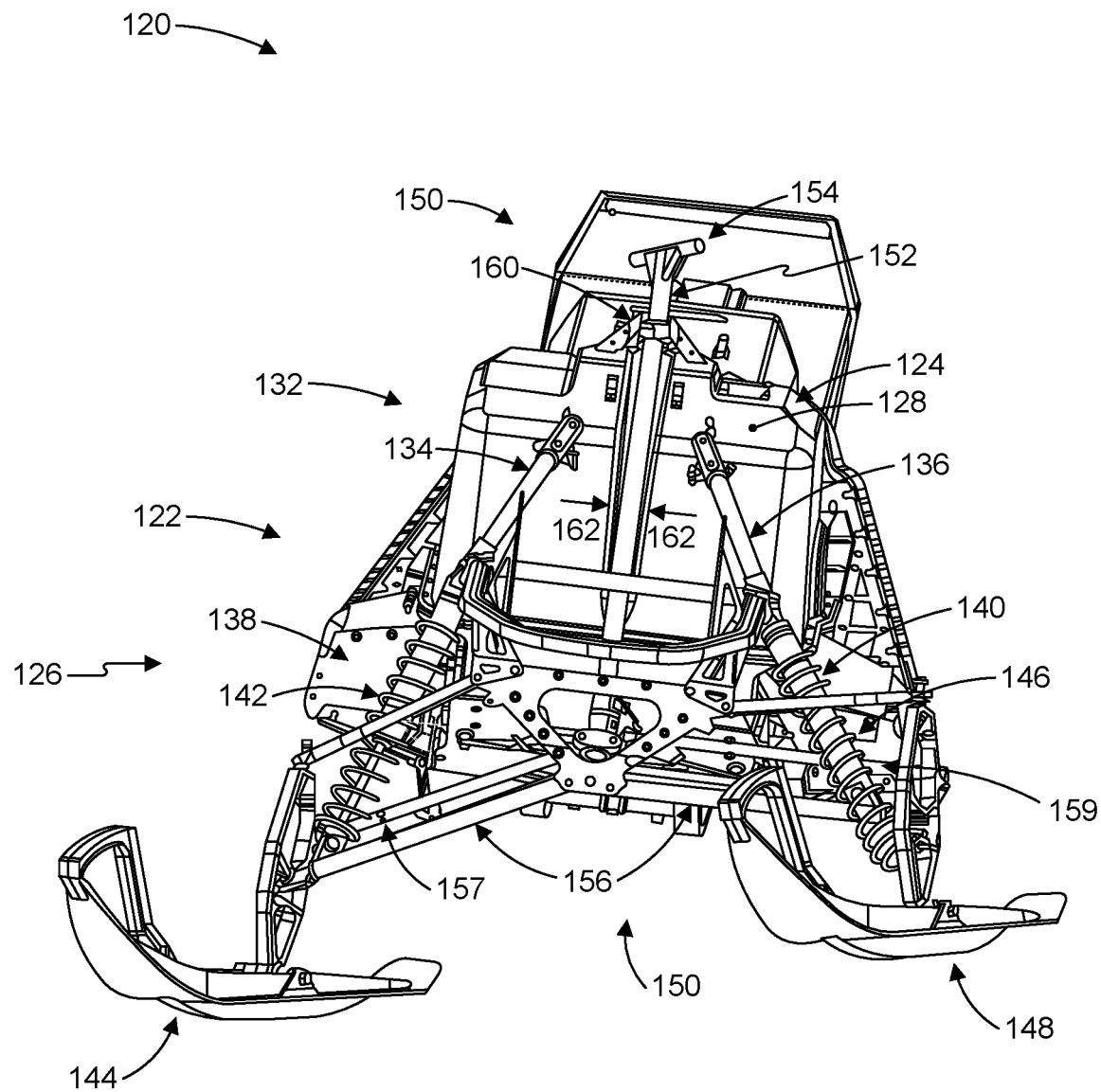
FIG. 2 is a front view of an electric vehicle embodied as a snowmobile, according to one example of the present disclosure.

FIG. 2 is a front view of an electric vehicle embodied as an electric snowmobile 120, according to one example of the present disclosure. The snowmobile 120 is illustrated with one or more elements removed to aid in describing the remaining elements of the snowmobile 120. For example, in one or more figures, various body panels of the snowmobile 120 (e.g., the hood) are removed, the endless track is removed and/or the snowmobile seat is removed.

The snowmobile 120 includes a chassis 122 (or frame), a battery pack 124 and a suspension system 126. The chassis 122 provides a load bearing framework for the snowmobile 120. The suspension system 126 connects the chassis 122 to the endless track and/or skis of the snowmobile 120, and provides the steering/handling of the snowmobile 120. The suspension system 126 may also provide shock absorption to improve ride quality for a user. The chassis 122 and/or suspension system 126 may be formed from, inter alia, metal, metal alloys, plastics and/or composites, for example.

As described above with respect to FIG. 1, the battery pack 124 comprises a battery enclosure 128 that houses one or more battery modules therein. In one example, the battery pack 124, and more specifically the battery enclosure 128, forms a structural element of the snowmobile 120 and is configured to receive, partially absorb and transfer loads from other snowmobile components, including the suspension system 126, the seating (not shown in FIG. 2), and/or a steering system 150, to the vehicle's center of mass and/or to the chassis 122.

The battery enclosure 128 is made of a material that provides sufficient structural support to the snowmobile 120, or another electric vehicle, such that it acts as a structural element of the vehicle. The material of the battery enclosure 128 has a stiffness sufficient for receiving and absorbing loads, as well as transmitting loads between the vehicle components (e.g., the suspension system 126, seating and steering system 150) and the vehicle's center of mass and/or the chassis 122. The battery enclosure 128 may provide sufficient structural support to replace traditional support members such as braces, tubes and linkages, thus facilitating a more lightweight, compact, cost-efficient and/or ergonomic design for the snowmobile 120.

In one example, the battery enclosure 128 is made of a carbon fiber composite material. Optionally, the carbon fiber composite material may have a thickness of 2-3 millimeters with an elastic modulus (i.e., stiffness) rating of at least 60 GPa. In other examples, the material has a stiffness rating between 10 GPa and 70 GPa.

In another example, the battery enclosure 128 is made of a material such as a polymer or a loaded polymer. In one example, the battery enclosure 128 is made of a glass fiber reinforced polymer (plastic) using an injection molding process, for example. In one example, the polymer incudes glass fiber reinforcement that provides stiffness to the battery enclosure 128. For example, the polymer may include between 20-40% glass fiber content, and in another non-limiting example, 30% glass fiber content. In another example, the material of the battery enclosure 128 has a stiffness rating of at least 10 times the stiffness of a suspension spring element (i.e., a shock absorber). In another example, the material of the battery enclosure 128 has a stiffness that can range from 3 GPa without any fiber reinforcement to approximately 13 GPa with a 40% fiber reinforcement. It is recognized that other combinations of material and fiber reinforcement may be used based on the type of material and fiber used, and design requirements for a given application.

Other materials that the battery enclosure 128 may be made from are also contemplated. For example, the battery enclosure 128 may be made in whole or in part from metal or metal alloys.

The battery enclosure 128 may be formed in a single piece, or multiple pieces that are secured together. For example, the battery enclosure 128 may include a floor (not shown) that may be a relatively flat plate that is secured to the chassis 122 and a lid that connects to the floor in order to create a cavity for housing the electric battery module(s). In another example, the battery enclosure 128 may be made of two halves that connect at a central seam. In other examples, the battery enclosure 128 could be made of a bucket and a top cover; or there could be a floor, a ring-like central portion and a cover or lid.

It is also recognized that in areas where additional support is needed, the thickness of the material can be increased to provide additional stiffness. For example, reinforcement ribs can be injection molded into the material shape and thickness using the same material. In this manner, additional support and stiffness can be selectively provided to desired areas of the battery enclosure while still injection molding the same material throughout the process.

In one example, in addition to being a structural element that is able to receive, absorb and/or transfer loads received from the suspension system 126, the steering system 150 and/or the seating, the battery enclosure 128 is also designed to withstand impact and damage that may be experienced during use of the snowmobile 120. In a further example, the battery enclosure 128 is designed to protect the electric battery from the elements, and when sealed, may provide a water-tight enclosure that is closed to water and foreign debris ingress. In this manner, the battery enclosure 128 may provide sufficient protection such that the electric battery module(s) can be housed directly within the battery enclosure 128.

In one example, the battery enclosure 128 might not be completely sealed to the elements and the electric battery module(s) may be provided within a non-structural watertight enclosure that is then, in-turn, housed within the structural battery enclosure 128. The battery enclosure 128 may include an exoskeleton that provides a relatively lightweight yet rigid shape to at least partially protect the battery modules, while also acting as a structural element of the snowmobile 120. For example, the exoskeleton may include a honeycomb lattice structure. Another enclosure, such as a watertight bag or container, for example, may provide the battery modules with protection from the elements.

Advantageously, the battery enclosure 128 may provide both housing of the battery modules (e.g., water-tight encapsulation and/or protection) and structural support. Combining this functionality in the battery enclosure 128 may reduce the size and/or weight of the chassis 122, for example, and enable a more lightweight, compact, cost-efficient and/or ergonomic design of the snowmobile 120. For example, implementing the battery enclosure 128 as a structural element may eliminate the need for other structural components that add strength and rigidity to the snowmobile 120.

Figure 3:
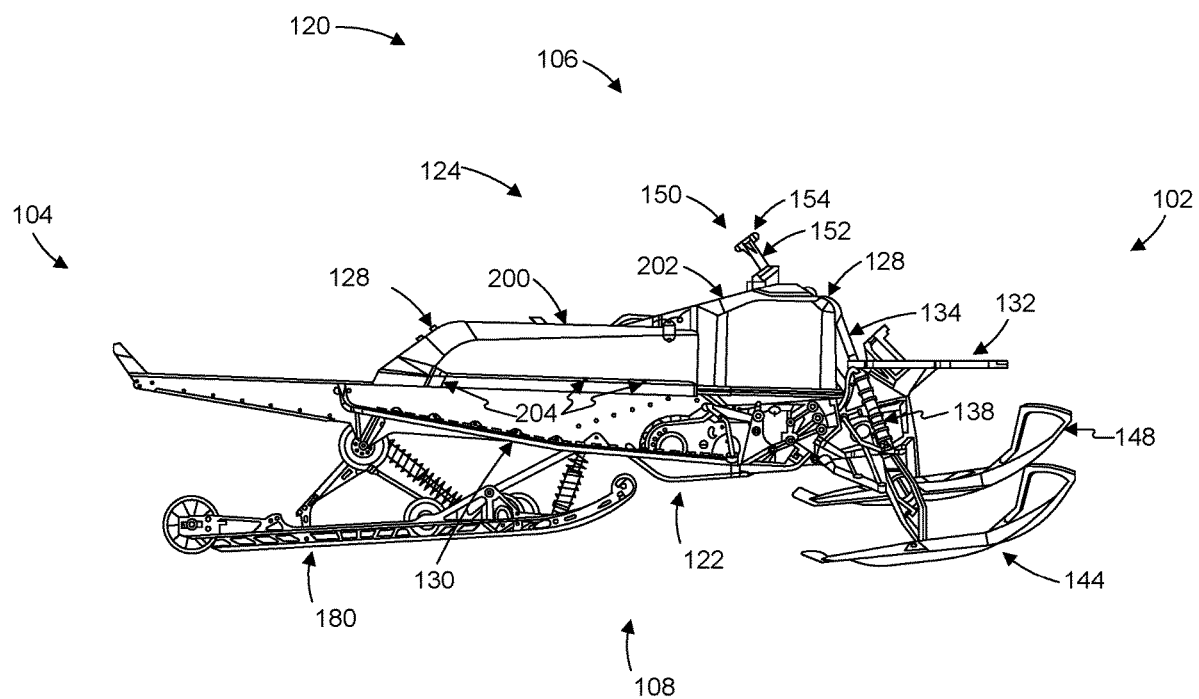
FIG. 3 is a side view of the snowmobile of FIG. 2.
Figure 4:
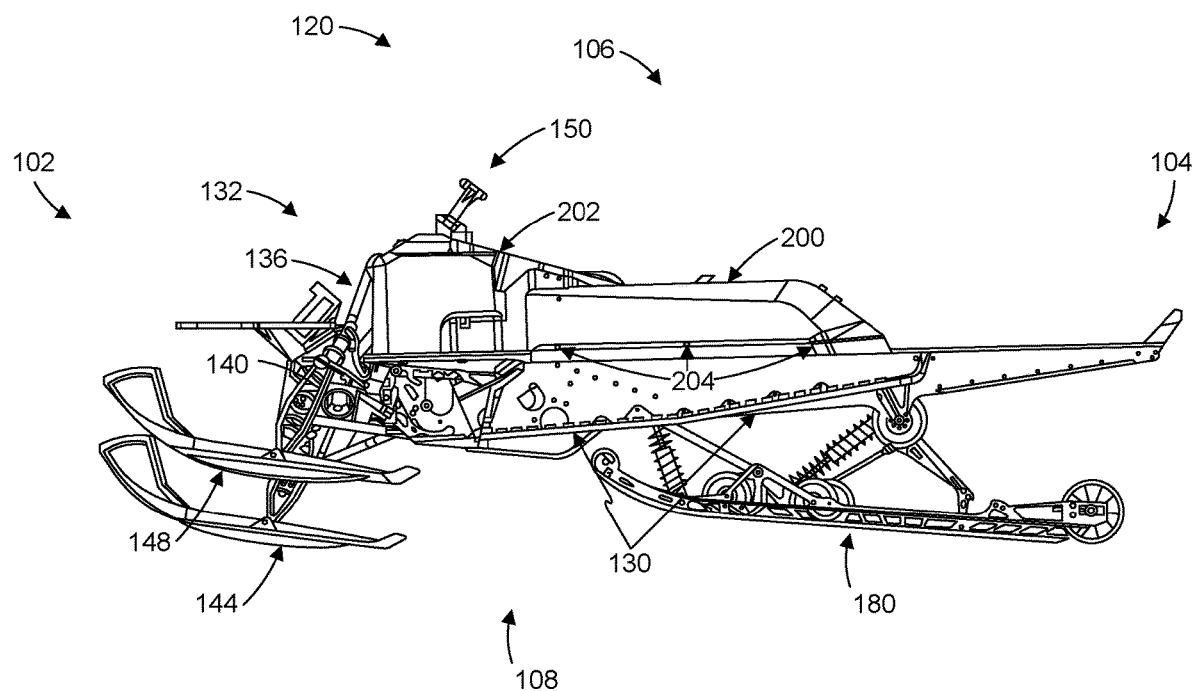
FIG. 4 is another side view of the snowmobile of FIG. 2.

FIG. 3 is a side view of the snowmobile 120 and FIG. 4 is another side view of the snowmobile 120. As shown in FIGS. 3 and 4, the snowmobile 120 includes a front end 102, a rear end 104 (or back end), a top 106 and a bottom 108. The snowmobile also includes two sides. One or more longitudinal axis, transverse axis and vertical axis may be defined for the snowmobile 120. A longitudinal axis generally extends between the front end 102 and the rear end 104 of the snowmobile 120, and corresponds to a typical horizontal direction of travel for the snowmobile 120. A vertical axis extends in the vertical direction between the top 106 and bottom 108 when the snowmobile 120 is oriented for operation, i.e., with the suspension system 122 supporting the snowmobile 120 on the ground. A transverse axis extends horizontally between the two sides of the snowmobile 120.

As also shown in FIGS. 2 to 4, the chassis 122 of the snowmobile 120 includes a rear tunnel 130 and a front brace structure 132. The front brace structure 132 is connected to and configured to receive loads from the suspension system 126. The front brace structure 132 includes a first top brace 134 and a second top brace 136. The rear tunnel 130 and/or the front brace structure 132 may be made from metal, metal alloys, plastics and/or composite materials, for example.

The suspension system 126 may be coupled to the battery enclosure 128, either directly or indirectly through the chassis 122, and more specifically through at least the front brace structure 132. In one example, the suspension system 126 may comprise a front suspension system that includes a first suspension leg 138 and a second suspension leg 140. The first suspension leg 138 includes a first shock absorber 142 and is coupled to a first ski assembly 144. The second suspension leg 140 includes a second shock absorber 146 and is coupled to a second ski assembly 148. The first top brace 134 is coupled between the battery enclosure 128 and the first suspension leg 138. The second top brace 136 is coupled between the battery enclosure 128 and the second suspension leg 140. The first suspension leg 138 and the second suspension leg 140 may also include other structural components, such as one or more wishbone arms and/or one or more anti-roll bars, that may be connected to the front brace structure 132 and/or to other portions of the chassis 122.

The shock absorbers 142, 146 may each comprise a coil over spring and damper assembly, a hydraulic or pneumatic piston assembly, or any other type of shock assembly known to those skilled in the art. The shock absorbers 142, 146 are connected either directly or indirectly between their respective ski assemblies 144, 148 and the front brace structure 132 of the chassis 122.

As shown in FIGS. 3 and 4, the suspension system 126 includes a back or rear suspension system 180 (which may also be referred to as a "skid" or "rear skid") to support the real tunnel 130. The rear suspension system 180 may include one or more skid rails to support an endless track that provides traction to drive the snowmobile 120. The rear suspension system 180 may also include a front control arm, a rear control arm and one or more shock absorbers that connect the slide rails to the rear tunnel 130.

Also illustrated in FIG. 2 is the steering system 150 having handlebar attachment 154 coupled to an upper portion of the steering column 152. The handlebar attachment 154 may enable handlebars to be rigidly coupled to the steering column 152 and enable a user to rotate the steering column 152 to turn the snowmobile 120 during use.

The steering system 150 also includes a steering assembly 156 coupled to the first and second ski assemblies 144, 148. The steering assembly 156 includes a first steering arm 157 (or steering link) and a second steering arm 159. The first steering arm 157 connects a lower portion of the steering column 152 to the first ski assembly 144 and the second steering arm 159 connects the lower portion of the steering column 152 to the second ski assembly 148. The connections between the steering column, the steering arms 157, 159 and the ski assemblies 144, 148 may be rotatable and/or pivotable (e.g., using ball joints) to accommodate rotation of the steering column 152 and/or motion of the suspension legs 138, 140. In some examples, the steering arms 157, 159 might not be directly coupled to the steering column 152. A rack and pinion assembly might be implemented between the steering column 152 and the steering arms 157, 159. In this way, the steering arms 157, 159 might be indirectly coupled to the steering column. Similarly, the steering arms 157, 159 might also or instead be indirectly coupled to the ski assemblies 144, 148.

The steering column 152 is securely and rotatably coupled to the battery enclosure 128 at a location 160 via a steering mount. The steering column 152 may extend at least partially through the battery enclosure 128. In one example, the steering column 152 freely rotates within a tunnel or slot 162 defined by the battery enclosure 128 during steering of the snowmobile 120. One or more examples of the steering system 150 are described in further detail elsewhere herein.

Reference is now made to FIG. 3 and FIG. 4. As indicated above, the chassis 122 comprises the rear tunnel 130 and the front brace structure 132. The battery pack 124 is illustrated positioned, at least partially, over the rear tunnel 130. The battery enclosure 128 of the battery pack 124 defines a tunnel portion 200 (or rear portion) and a front portion 202. In one example, the tunnel portion 200 (or rear portion) is connected to the rear tunnel 130 of the chassis 122, and the front portion 202 is connected to the front brace structure 132. In one example, the tunnel portion 200 may be generally rectangular shaped with one or more chamfered edges, although other shapes are also possible, including an elongated dome shape, or a truncated prismatic shape, among other possibilities. The tunnel portion 200 is connected to the rear tunnel 130 of the chassis 122 at connection points or blocks 204. The tunnel portion 200 may be rigidly connected to the rear tunnel 130 via mechanical fasteners such as nuts and bolts, rivets, staples, etc. In some embodiments, a bottom portion or floor of the battery enclosure 128 may be connected to the rear tunnel 130 more permanently via welding, soldering or adhesion among other possibilities. In such a case, an upper portion or lid of the battery enclosure 128 may then be rigidly fastened to the floor via mechanical fasteners, a friction fit, a snap fit or any other suitable removable fastening mechanism.

As shown in FIG. 2, the front portion 202 of the battery enclosure 128 may be generally rectangular shaped and is located towards the front of snowmobile 120. In some cases, the front portion 202 may have one or more chamfered edges. In one example, front portion 202 of the battery enclosure 128 has different width and height dimensions from tunnel portion 200 of the battery enclosure 128, such that there is a clear visual demarcation between the tunnel portion 200 and the front portion 202 of the battery enclosure 128. However, in other embodiments, the front portion 202 may have only a different height or a different width from the tunnel portion 200, and not both. In still further embodiments, the front portion 202 may have the same height and width as the tunnel portion 200 along an entire length of the battery enclosure 128, such that there is no distinct visual demarcation between the tunnel portion 200 and the front portion 202. In still further embodiments, the battery enclosure 128 may gradually increase in height and/or width from the rear of the tunnel portion 200 to the front of the front portion 202. The battery enclosure 128 may have any shape or configuration that is suitable for housing one or more battery modules and attaching to the tunnel 130 and front brace structure 132 of the electric vehicle.

Figure 5A:
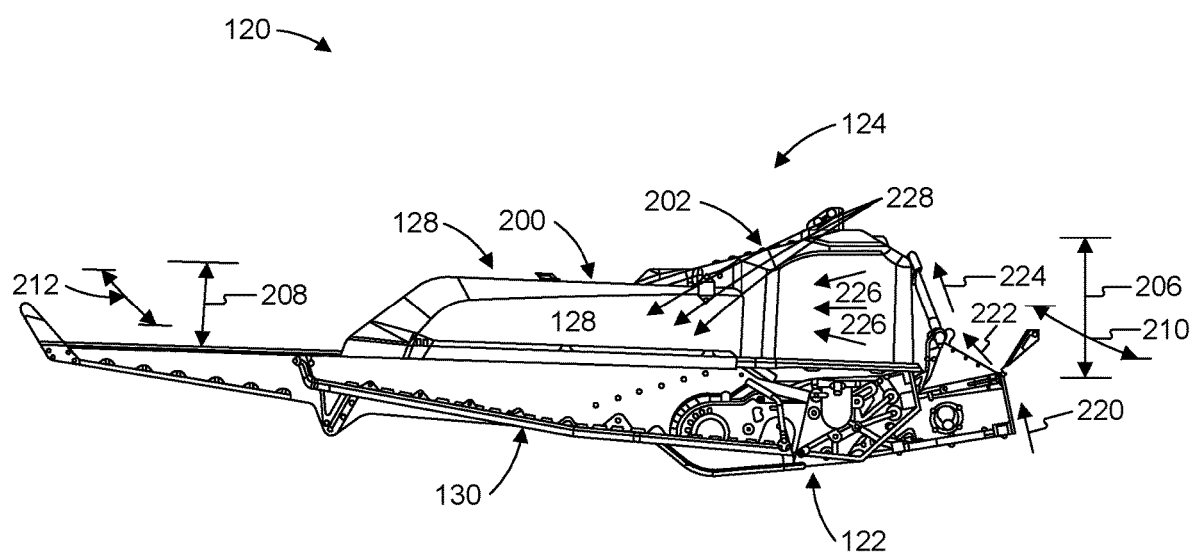
FIG. 5A is a partial side view of the snowmobile of FIG. 2.

FIG. 5A is a partial side view of the snowmobile 120. With reference to FIG. 5A, in one example, the front portion 202 of the battery enclosure 128 defines a first height 206 and the tunnel portion 202 of battery enclosure 128 defines a second height 208. As illustrated, the first height 206 and the second height 208 are generally measured along a vertical axis of the snowmobile 120. In one example, the first height 206 is greater than the second height 208. In other examples, the first height 206 is less than the second height 208. In one example, the front portion 202 of battery enclosure 128 defines a first width 210 and the tunnel portion 202 of battery enclosure 128 defines a second width 212. As shown, the first width 210 and the second width 212 are generally measured along a transverse axis of the snowmobile 120. In one example, the first width 210 is greater than the second width 212. In other examples, the first width 210 is less than the second width 212.

In one example, battery pack 124 has an approximate overall length (along a longitudinal axis) of 1563 mm, width of 596 mm, and height of 437 mm. It is recognized that the overall length, width and height of battery pack 124 may vary based on the design of snowmobile 120. In another example, the approximate overall length of battery pack 124 is in a range of 750-2000 mm, the width is in a range of 450 mm-600 mm, and the height is in a range of 350-550 mm.

Figure 6:
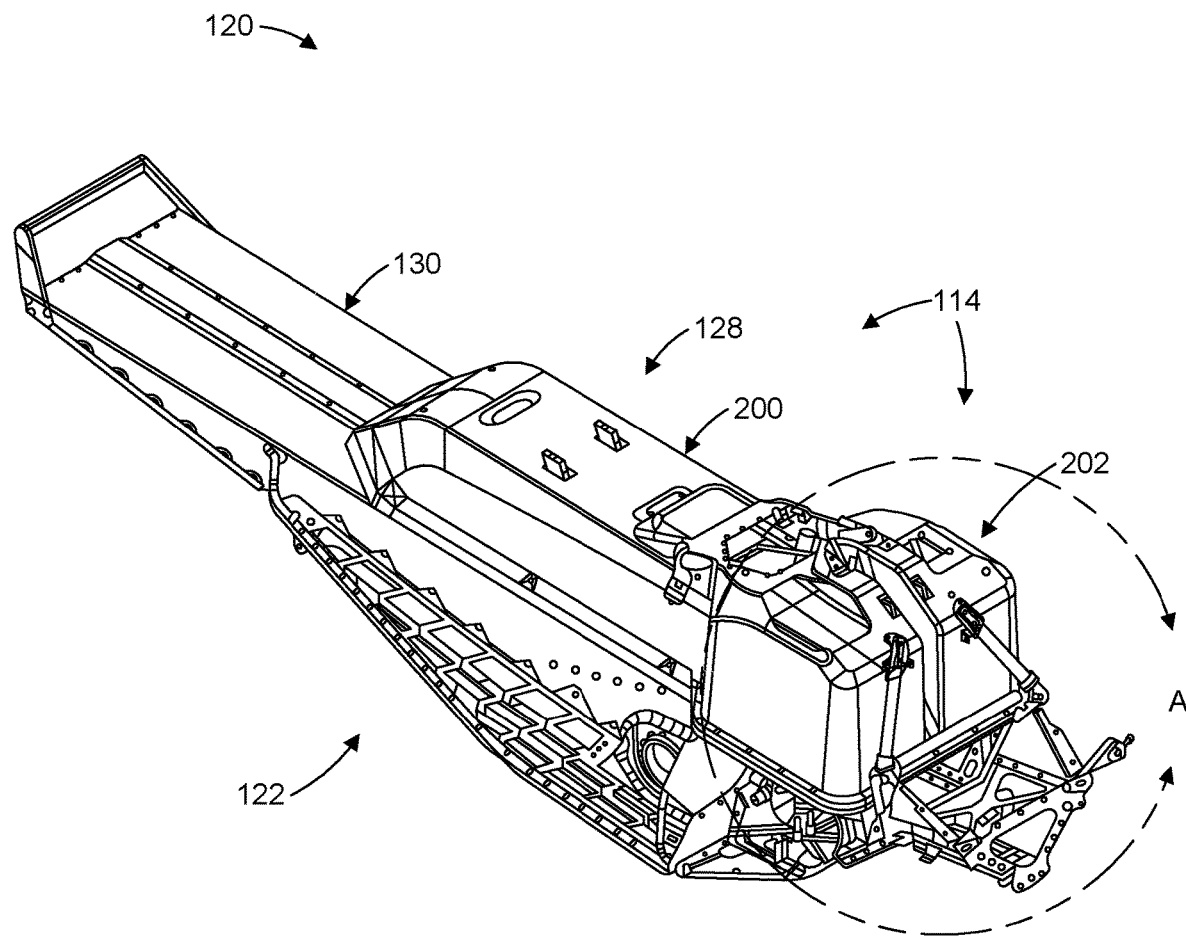
FIG. 6 is a front top partial perspective view of the snowmobile of FIG. 2.

FIG. 6 is a top front perspective view of the snowmobile 120. The battery enclosure 128 includes the tunnel portion 200 positioned over rear tunnel 130, and the front portion 202 positioned at or in proximity to the front of the rear tunnel 130.

In one or more examples, it is recognized that the battery enclosure 128 may provide one single internal cavity for the battery module(s) of the electric battery, or multiple segmented internal cavities that can separate the different battery module(s) of the electric battery. There may be cutouts in the segmenting walls for enabling electrical interconnection of the battery modules.

In one example, the battery enclosure 128 may be one overall component made up of a floor and a cover or lid. In another example, the battery enclosure 128 may comprise multiple separate battery enclosure components that each have a floor and cover or lid. The separate enclosure components may comprise two separate enclosure components (for example, the tunnel portion 200 and the front portion 202 may each form a separate distinct battery enclosure component). Alternatively, the battery enclosure 128 could be divided up differently, and into even more than two separate battery enclosure components. The separate battery enclosure components can be positioned on the chassis 122 in the same configuration as described for a single battery enclosure (i.e., in the same position as shown FIG. 3), or the different individual battery enclosure components could be positioned differently in relation to the rear tunnel 130 and front brace structure 132 of the chassis 122. In one example, the front portion 202 may be positioned in a mid-bay region in horizontal alignment with the rear tunnel 130 and the motor is positioned above the front portion 202 of the battery enclosure 128. The separate battery enclosure components may be unconnected when installed on an electric vehicle, or the separate battery enclosure components could be connected together with brackets, etc. The electric battery module(s) housed within the separate battery enclosure components would be electrically interconnected.

As described above, multiple battery enclosures may be used and operably connected together. The multiple battery enclosures may allow for a more optimal weight distribution. In one example, as batteries get smaller and more powerful it may be beneficial to locate the batteries in a number of enclosures to improve ergonomic design and performance of the electric vehicle.

In one example, the battery enclosure 128 may house only the electric battery modules (and possibly wiring/electronics and supporting structures for the battery modules) of the electric battery. In another example, the battery enclosure 128 may house the electric battery as well as other components of the electric vehicle, such as battery management controllers, thermal management systems, a motor assembly, etc.

Figure 7A:
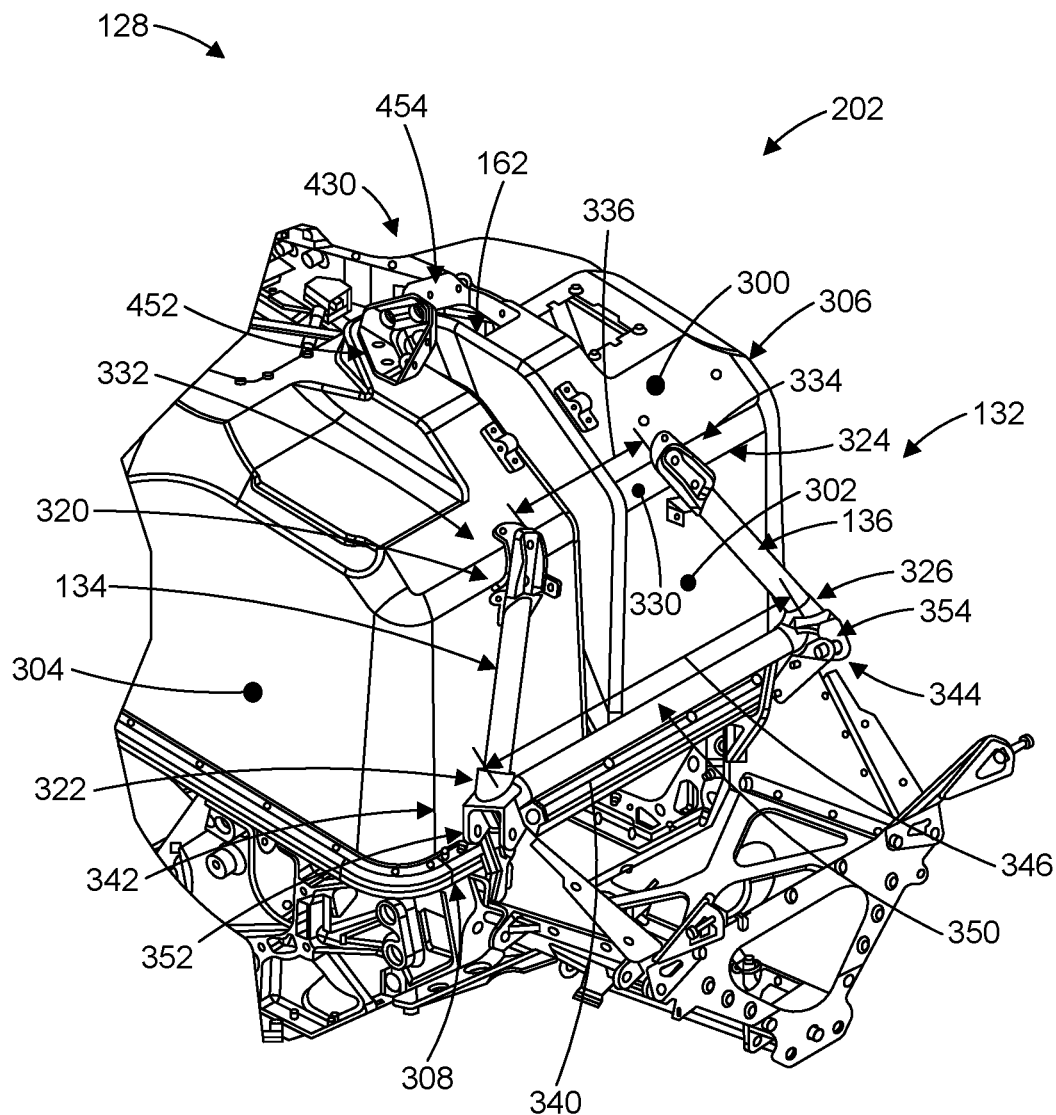
FIG. 7A is an enlarged partial perspective view of section A of FIG. 6.

FIG. 7A is an enlarged partial perspective view of section A of FIG. 6 showing the battery enclosure 128 front portion 202. The front portion 202 includes a top surface 300, a front surface 302, a first side surface 304, a second side surface 306, and a bottom surface 308. It should be noted that the top surface 300 is not limited to a single flat surface. For example, the top surface 300 may be formed from multiple surfaces disposed at the top of the battery enclosure 128. There may also or instead be multiple top surfaces of the battery enclosure 128. Similar comments apply to the front surface 302, the first side surface 304, the second side surface 306 and the bottom surface 308.

The front brace structure 132 may be coupled to the battery enclosure 128 at one or more of the top surface 300, the front surface 302, the first side surface 304, the second side surface 306 and the bottom surface 308. In one example, the front brace structure 132 is coupled to battery enclosure 128 at least partially at the top surface 300. In another example, the front brace structure 132 is coupled to the battery enclosure 128 at least partially at the front surface 302. In another example, the front brace structure 132 is coupled to the battery enclosure 128 at least partially at a front edge 330 formed by the top surface 300 and the front surface 302. The front brace structure 132 may also or instead be coupled to the battery enclosure 128 at the bottom surface 308.

In one example, the front brace structure 132 is rigidly coupled to the battery enclosure 128 at four connection points for transferring load to the battery enclosure 128. The front brace structure 132 includes the first top brace 134 and the second top brace 136. The first top brace 134 includes a first end 320 and a second end 322. The second top brace 136 includes a first end 324 and a second end 326. The first top brace 134 is connected to battery enclosure 128 at the first end 320. In one example, the first end 320 of first top brace 134 is connected to both the top surface 300 and the front surface 302 at the front edge 330 (at a first connection location 332). The second top brace 136 is connected to the battery enclosure 128 at the first end 324. In one example, the first end 324 of the second top brace 136 is connected to both the top surface 300 and the front side surface 302 at the front edge 330 (at a second connection location 334). In one example, the first connection location 332 is spaced apart from the second connection location 334 along the front edge 330, identified as top space 336. The top space 336 is shown as distance between the first connection location 332 and the second connection location 334 along a lateral axis of the snowmobile 120.

In one example, the second end 322 of first top brace 134 is connected to the front surface 302 and/or to the bottom surface 308 of the battery enclosure 128 (at a third connection location 342) via one or more linkages. In one example, the second end 326 of second top brace 136 is connected to the front surface 302 and/or to the bottom surface 308 (at a fourth connection location 344) via one or more linkages. Optionally, the third connection location 342 and/or the fourth connection location 344 is at a front bottom edge 340 formed by the front surface 302 and the bottom surface 308 of the battery enclosure 128. In one example, the third connection location 342 is spaced apart from the fourth connection location 344 along the front bottom edge 340, identified as bottom space 346. The bottom space 346 is shown as distance between the third connection location 342 and the fourth connection location 344 along a lateral axis of the snowmobile 120. In one example, bottom space 346 is wider than top space 336. In another example, top space 336 is wider than bottom space 346. In yet another example, the top space 336 is approximately equal to the bottom space 346.

In one example, the front brace structure 132 includes a cross brace structure 350. The cross brace 350 extends between the first top brace 134 and the second top brace 136. The cross brace 350 provides bracing between the first top brace 134 and the second top brace 136 at the second end 322 and the second end 326. In one example, the cross brace 350 is connected to the second end 322 at a joint member 352. The cross brace 350 is connected to the second end 326 at a joint member 354.

Figure 7B:
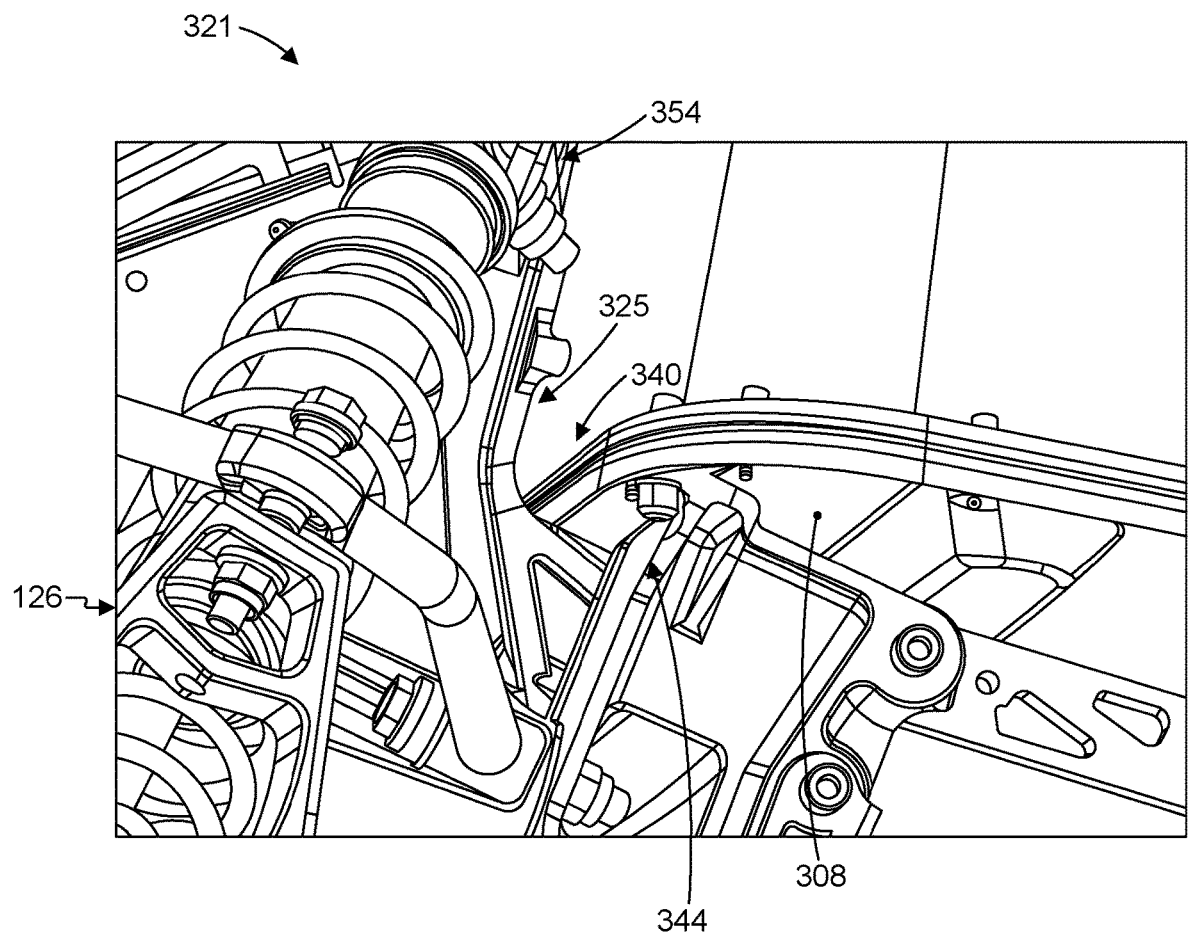
FIG. 7B is an enlarged partial perspective view of a connection location shown in FIG. 7A.

FIG. 7B is an enlarged partial view of the fourth connection location 344, indicated at 321. Referring to FIG. 7B, the second top brace 136 is connected to the battery enclosure 128 at the second end 326 through the joint member 354 and a mechanical linkage 325.

As outlined above, the front portion 202 of the battery enclosure 128 is coupled to the front brace structure 132. In the example shown in FIG. 7A, the first top brace 134 and the second top brace 136 of the front brace structure 132 are connected to front portion 202 of the battery enclosure 128. More specifically, in the example shown, the four connection points 332,334,342,344 provide a secure and rigid connection between the front brace structure 132 and battery enclosure 128. This provides for the transferring of loads between suspension system 126 and the battery pack 124. The connection points 332, 334, 342, 344 may implement, inter alia, mechanical fasteners (e.g., nuts, bolts, screws and rivets), welds, adhesives, snap-fit connections and any combination thereof to form rigid connections.

It is recognized that other design configurations and connections may exist between the front brace structure 132 and the battery enclosure 128, in order for the battery enclosure 128 to be connected to and receive loads from suspension system 126. In one example, there are fewer than four connection points between front brace structure 132 and the battery enclosure 128. In one example, there are more than four connection points between the front brace structure 132 and battery enclosure 128. The surfaces and/or edges of the battery enclosure 128 on which the connection points are located are also not limited. For example, the front brace structure may also or instead be coupled to the first side surface 304 and/or to the second side surface 306. The connection points may be fixed or removable. The structure of the front brace structure 132 may take on many different forms and remain within the scope of the present disclosure.

In one example, loads or forces imparted by the steering system 150, and more specifically by the steering column 152, of the electric vehicle are received by the battery enclosure 128 of the battery pack 124. These loads are partially absorbed by the battery enclosure 128 and/or transferred to the vehicle's center of mass and/or chassis 122 through the battery pack 124.

Figure 11:
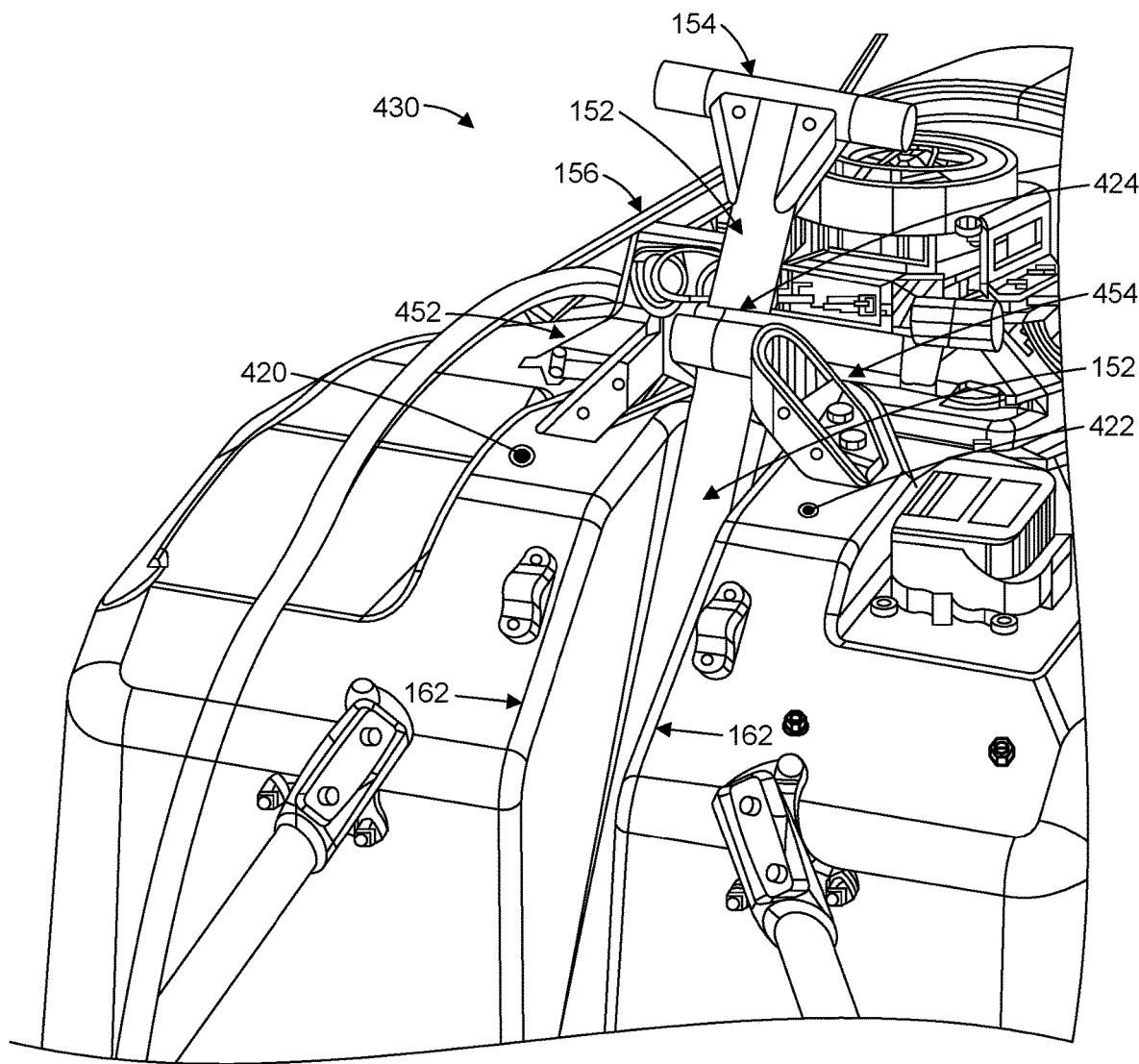
FIG. 11 is an enlarged partial perspective view of the snowmobile of FIG. 2.

FIG. 11 is an enlarged partial perspective view of the snowmobile 120. In the example shown in FIG. 11, the steering system 150 comprises a steering mount 430 that includes a first side mount 452 and a second side mount 454 attached to the front portion 202 of the battery enclosure 128. The first side mount 452 and/or the second side mount 454 may implement, inter alia, one or more mechanical fasteners, welds, adhesives, snap-fit connections and any combination thereof to rigidly connect to the battery enclosure. A member 424 extends between first side mount 452 and second side mount 454, and operates to hold the steering column 152 to the battery enclosure 128. The member 424 also allows steering column 152 to rotate during operation of the steering system 150.

In one example, the member 424 includes a pipe member having an axis aligned with an axis of the steering column 152. In operation, the steering column 152 passes through the pipe member and is supported by the pipe member.

As the operator of the snowmobile 120 steers and maneuvers the vehicle, loads are transferred from the steering column 152 to the steering mount 430, which in turn transfers loads from the steering column 152 to the battery pack 124, and specifically the battery enclosure 128. The battery enclosure 128 may absorb some of those loads and/or transfer the loads from the steering column 152 to the vehicle's center of mass and/or the chassis 122.

Figure 12:
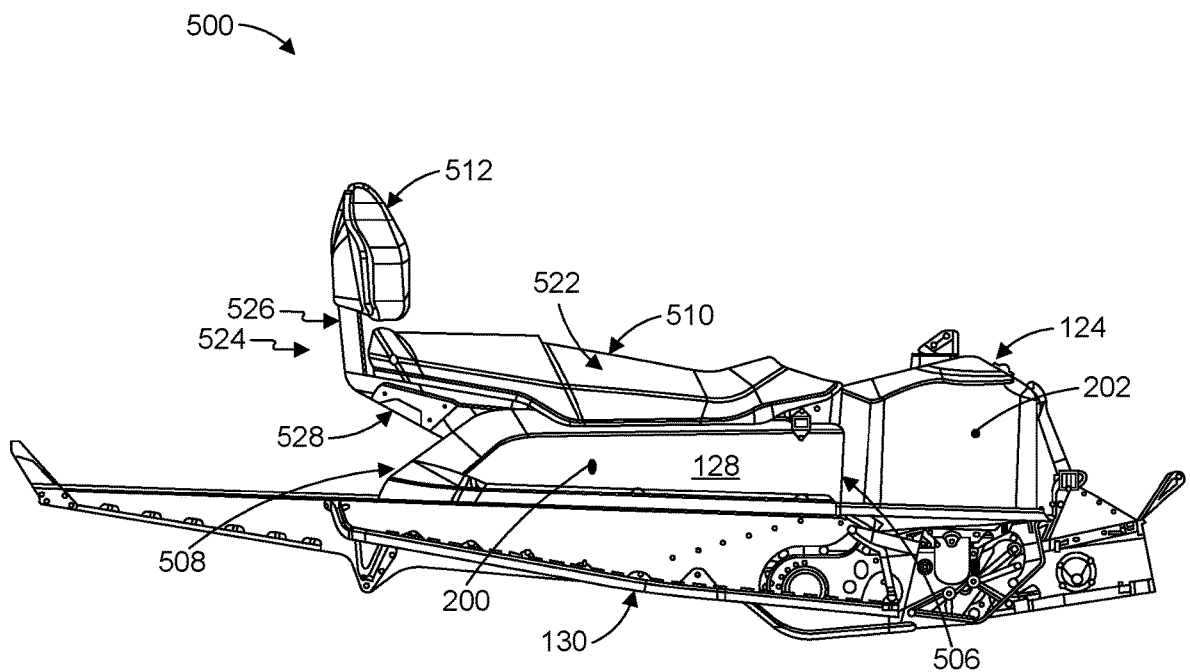
FIG. 12 is a partial side view of a snowmobile, according to one example of the present disclosure.

FIG. 12 is a partial side view of a snowmobile 500, according to one example of the present disclosure. Snowmobile 500 is similar to the snowmobile 120 previously detailed herein. Snowmobile 500 includes battery pack 124 having battery enclosure 128.

The battery enclosure 128 includes the tunnel portion 200 and the front portion 202. The tunnel portion 200 includes a tunnel portion front end 506 and a tunnel portion back end 508. The tunnel portion 200 is located over and secured to the chassis rear tunnel 130. The front portion 202 is located near the front of the snowmobile 500, at the tunnel portion front end 506.

The snowmobile 500 includes a seat 510 and a backrest 512. As illustrated, the snowmobile seat 510 is a straddle-seat that is to be straddled by a rider, i.e., with a leg positioned on either side of the seat 510. The seat includes a cushion 522.

The battery pack 124 provides structural support for the snowmobile 500 seating, which may comprise one or both of a snowmobile seat 510 and backrest 512. In one example, the snowmobile seat 510 and backrest 512 are mounted directly to the battery pack enclosure 128. In one example, the seat 510 is mounted to the battery pack enclosure 128 via brackets (not shown) such that a space is provided between the tunnel portion 200 of the battery pack enclosure 128 and the seat 510. In another example, the seat 510 is mounted to the battery pack enclosure 128 such that at least a portion of a bottom surface of the seat 510 is in direct contact with a surface of the tunnel portion 200 of the battery pack enclosure 128. The seat 510 is connected to the tunnel portion 200 of the battery enclosure 128, and extends from the front portion 202 at the tunnel portion front end 506 to the tunnel portion back end 508. Battery enclosure 128 is a structural element of the snowmobile that supports seat 510 and optionally the backrest 512. Further, the battery enclosure 128 tunnel portion 200 receives loads transmitted from the seat 510 and partially absorbs and/or transfers those loads to the vehicle's center of mass and/or the chassis 122 due to one or more riders positioned on the seat 510 or the result of operation of the snowmobile 500 over various snow terrain.

In some examples, heat generated by the battery pack 124 may be transferred through the battery enclosure 128 and into the seat 510. This heat may be generated during discharge of the battery pack 124 to power an electric motor and/or other systems of the snowmobile 500. The heat may be transferred passively to the seat 510 via radiation, conduction and/or convection, for example. Transfer of the heat into the seat 510 may warm the cushion 522 and, optionally, an operator seated on the cushion 522. In this way, by mounting the seat 510 onto the battery pack 124, heat generated by the battery pack 124 may provide a more pleasant experience for the operator in cold conditions. This heat might otherwise be lost into the ambient environment. Further, because an operator may straddle the battery pack 124 when riding the snowmobile 500, heat generated by the battery pack 124 may radiate out the lateral sides of the battery enclosure 128 and warm the legs of the operator.

The seat backrest 512 is supported by the battery enclosure 128 tunnel portion 200. In one example, the seat backrest 512 is mounted directly to the battery enclosure 128 at the tunnel portion back end 508. The seat back rest 512 includes a bracket 524. The bracket 524 is generally L-shaped, including a generally vertical first leg 526 and a generally horizontal second leg 528. A cushion of the backrest 512 may be attached to the first leg 526. The second leg 528 is attached to the tunnel portion 200. The seat 510 may extend rearward beyond a top surface of the battery enclosure tunnel portion 200 and be supported by the second leg 528. Seat loads (e.g., by a rider during operation of the snowmobile) are received by the battery pack 124, and specifically the battery enclosure 128, via connection points between the seat 510 and the battery pack 124. Additionally, seat loads are transferred during use from the seat backrest 512 to the battery pack 124 at locations where the seat backrest 512 is connected to the battery pack 124.

In one example, the seat 510 is rigidly fastened at four places onto the battery pack 124. There may be two plastic hooks (not shown) on the top surface of the tunnel portion back end 508 of the battery enclosure 128 that mate with corresponding slots located on the bottom of the seat 510 (i.e., the seat pan). Additionally, there may be two aluminum tabs on a fore portion of the seat pan (one on each side) that fasten the seat 510 to the battery enclosure 128. In one example, the seat 510 is rigidly fastened to the battery pack 124 via the seat pan using screw holes with threaded inserts on the lid of the battery enclosure 128. Other types of connections between the seat 510 and the battery enclosure 128 are also possible.

In one example, the seat backrest 512 is fully supported by the battery enclosure 128. In contrast, typical backrests are mounted directly to a snowmobile chassis. With the battery enclosure 128 being used to fully support the seat backrest 512, additional storage area is available on the rear tunnel 130 for cargo or other utility use. In one example, the backrest 512 is a separate component independently and directly attached to the battery pack 124 using one or more mechanical fasteners, welds, adhesives, snap-fit connections and any combination thereof, for example. In another example, the seat backrest 512 is at least partially part of or an extension of the seat 510.

Loads imparted on the snowmobile seating (i.e., one or both of the seat 510 and the backrest 512), are received directly by the battery pack 124, and specifically the battery enclosure 128. The battery enclosure 128 may absorb some of those loads and/or transfer the loads from the seating to the vehicle's center of mass and/or the chassis 130.

In operation, as the snowmobile 120, 500 is driven across a varied terrain, loads are transferred from the suspension system 126 (e.g., the first suspension leg 138 and the second suspension leg 140) through the front brace structure 132 (e.g., through the corresponding first top brace 134 and the second top brace 136) to the battery enclosure 128. Likewise, loads are transferred from the seating (e.g., the seat 510 and the backrest 512) and the steering system 150 to the battery enclosure 128. The battery enclosure 128 acts as a structural element, and after receiving the loads then transfers the loads through the body of the battery enclosure 128 to the vehicle's center of mass and/or to the rear tunnel 130. In one or more examples described herein, loads are transferred to the rear tunnel 130 since the center of mass of the vehicle is located at the rear tunnel 130. As such, it is recognized that the loads are transferred to the center of mass located within the rear tunnel 130.

Figure 5B:
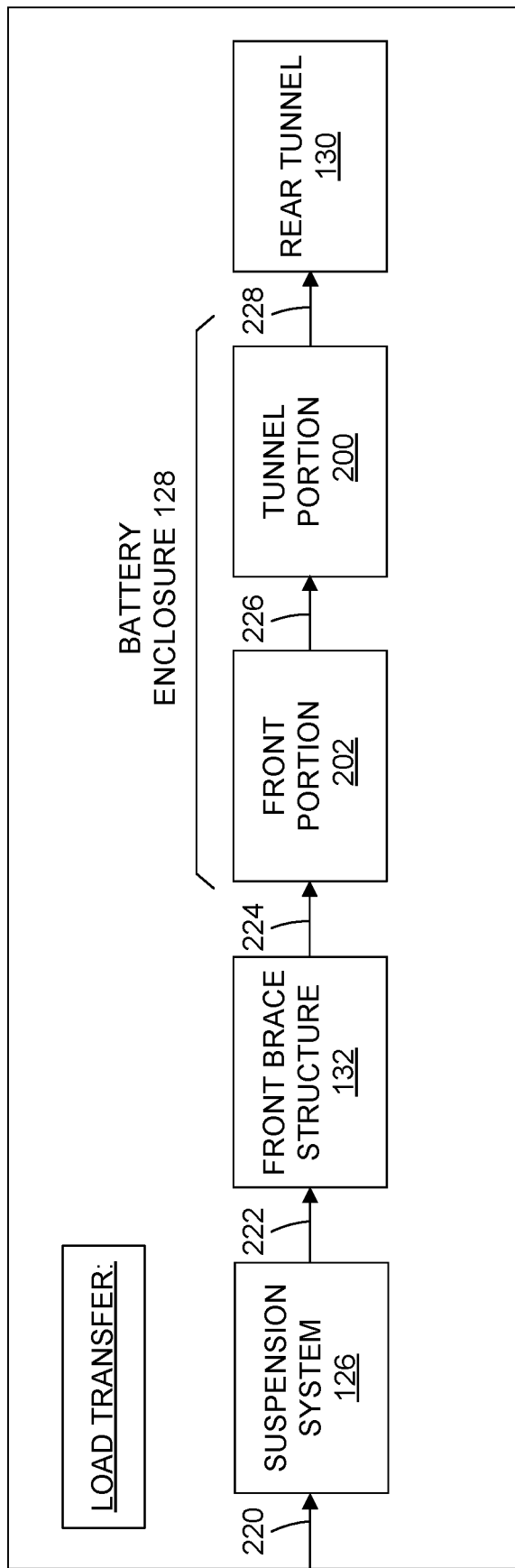
FIG. 5B is a block diagram illustrating a load path of a snowmobile, according to one example of the present disclosure.

FIG. 5B is a block diagram illustrating a load path of a snowmobile (e.g., the snowmobile 120, 500), according to one example of the present disclosure. The load path is also illustrated in FIG. 5A. The load path is illustrated using arrows 220, 222, 224, 226 and 228. In one example, as the snowmobile 120, 500 moves over a given terrain or snow profile, load is transferred from the suspension system 126 (via the first suspension leg 138 and the second suspension leg 140) to the front brace structure 132 (via the first top brace 134 and the second top brace 136); load is then transferred from the front brace structure 132 (via first the top brace structure 134 and second the top brace structure 136) to the battery enclosure 128 (e.g., to the front surface 302 of the battery enclosure 128); and the load is then transferred, at least partially, from the battery enclosure 128 (via the front portion 202 and the tunnel portion 200) to the chassis 122 including the rear tunnel 130.

Traditional electric powersport vehicles, such as combustion engine snowmobiles, often have curved steering columns and/or complex linkages connecting the steering column to their steering assembly. This is a result of the steering column having to avoid interference with the combustion engine, which is typically housed in the front portion of the snowmobile.

In some embodiments, an electric vehicle includes a battery pack design that accommodates a straight steering column. Such battery pack designs may leverage the modular nature of battery pack components. For example, battery modules and/or other components of a battery pack may be arranged within the battery pack to form a slot to receive the steering column.

It should be noted that battery packs and enclosures without a slot for receiving a steering column are also contemplated and are included within the scope of the present disclosure.

Figure 8:
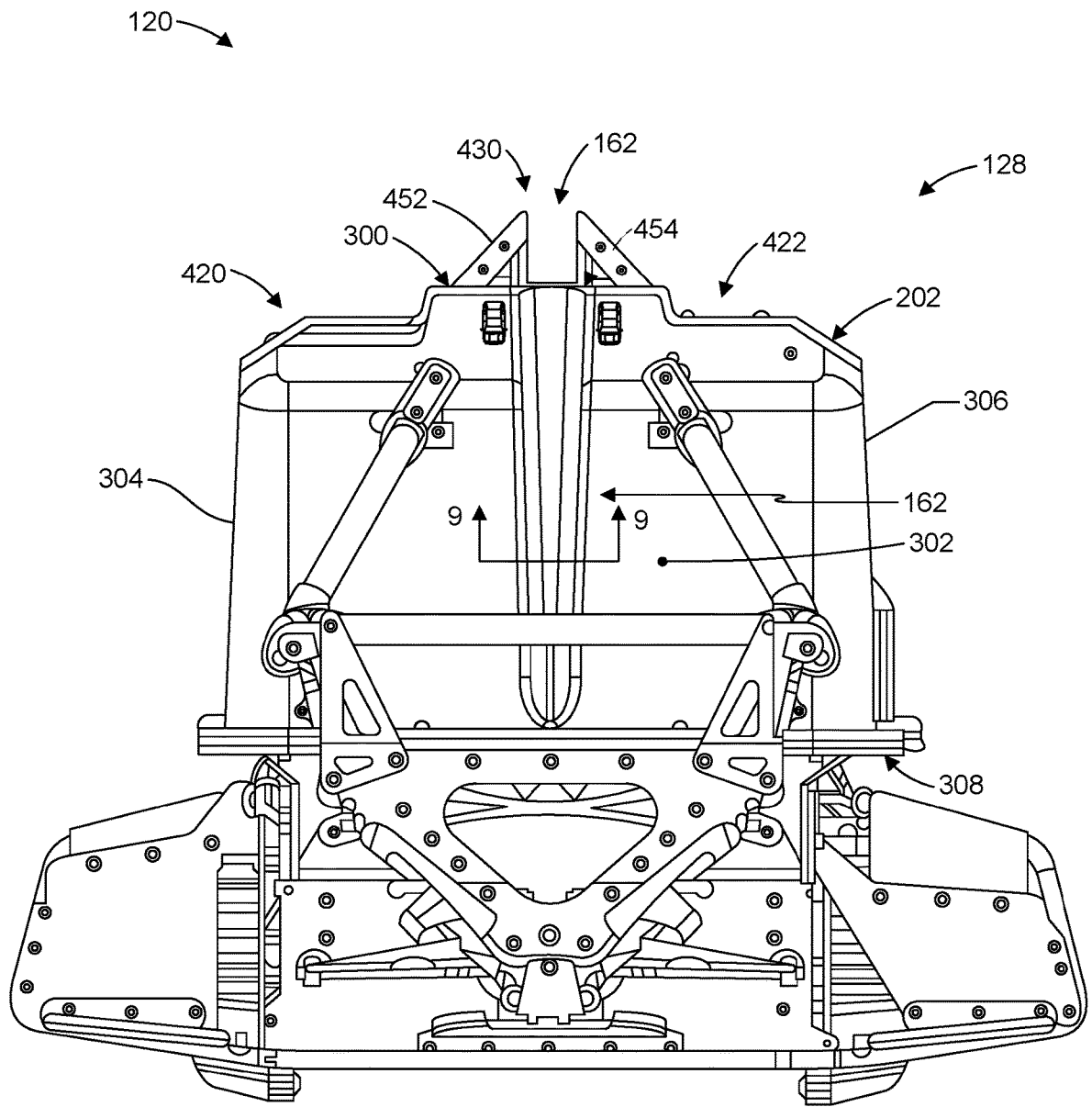
FIG. 8 is a partial front view of the snowmobile of FIG. 2.

Reference is now made to FIG. 8. FIG. 8 is a partial front view of the battery enclosure 128 and the chassis 122 of the snowmobile 120. In one example, the battery enclosure 128 front portion 202 may define a slot 162. The slot 162 is illustrated as a substantially straight channel or groove in the front portion 202 of the battery enclosure 128. The slot 162 extends downward from the top surface 300 of the battery enclosure 128 for receiving the steering column 152 of the snowmobile 120. In this way, the steering column 152 is able to at least partially pass through the battery enclosure 128. The straight slot 162 defined within the battery enclosure 128 enables the electric vehicle to use a linear, substantially straight, steering column 152 and a relatively uncomplex connection between the steering column 152 and the steering assembly 156.

In one example, the slot 162 extends from the top surface 300 of battery enclosure 128 to a front surface 302 of the battery enclosure 128. The slot 162 may be at least partially formed by the front surface 302. In another example, the slot 162 extends downwards from the top surface 300 of the battery enclosure 128 to the bottom surface 308 of the battery enclosure 128. The slot 162 may at least partially pass through the bottom surface 308.

In one example, the slot 162 is generally geometrically shaped. For example, the slot 162 can be partially circular, oval or square shaped in cross-section. In other examples, the slot 162 is not geometrically shaped. The slot 162 may have an open side along its length. In other embodiments, the slot 162 can be defined as a wholly or partially enclosed slot extending through the battery enclosure 128. In one or more examples, the slot 162 may take on the form of a tunnel, pipe, or tubular member.

Figure 9:
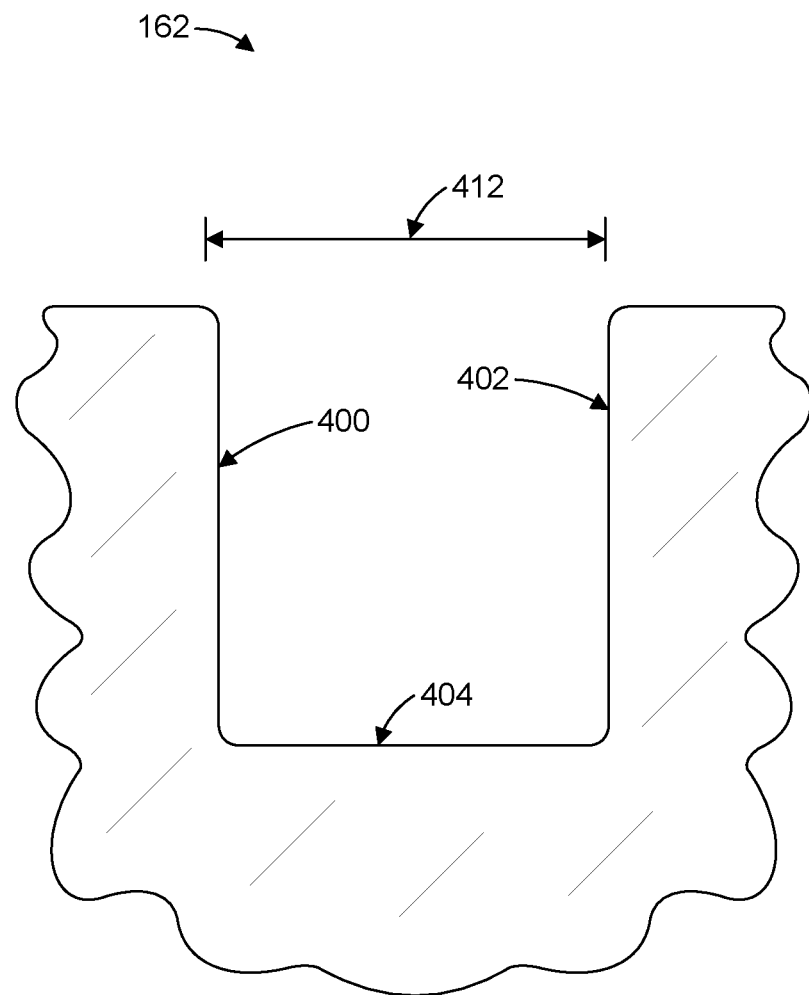
FIG. 9 is a cross-sectional view of a portion of a battery enclosure taken along the line 9-9 in FIG. 8.
Figure 10:
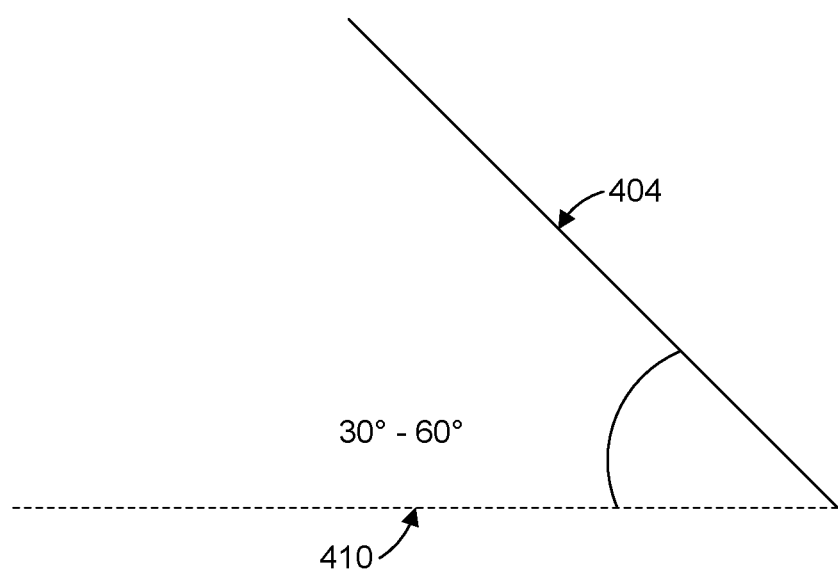
FIG. 10 is a diagram illustrating an angle of a surface of the battery enclosure of FIG. 9 relative to a longitudinal axis of the snowmobile of FIG. 2.

FIG. 9 is a cross-sectional view of the slot 162 taken along the line 9-9 in FIG. 8. In one example, the slot is generally U-shaped in cross-section. The slot 162 is defined by a first side wall 400, a second side wall 402, and a bottom surface 404. Additional walls and/or surfaces may also be present in other slot designs. In one example, the bottom surface 404 has an angle along its length that generally matches an angle of the steering column 152. FIG. 10 is a diagram illustrating an angle of the bottom surface 404 relative to a substantially horizontal longitudinal axis of the snowmobile 120 indicated at 410. With reference to FIG. 10, the bottom surface 404 of the slot 162 extends at an angle of between 30 degrees and 60 degrees with respect to the horizontal longitudinal axis 410. In one example, the substantially horizontal longitudinal axis 410 of the electric snowmobile is defined by a top surface of rear tunnel 130.

A width 412 of the slot 162 is defined by the distance between the first sidewall 400 and the second sidewall 402. In one example, the width 412 of slot 162 is between 30 millimeters and 60 millimeters. The width of slot 162 may vary along its length. In one example, the width of slot 162 is wider at a top end of the slot 162 than at a bottom end of slot 162. In another example, the width 412 of slot 162 is substantially constant along its length with first sidewall 400 being substantially parallel to second sidewall 402.

Referring back to FIG. 8, in one example, the slot 162 divides the front portion 202 of battery enclosure 128 into two sides, defined as a front portion first side 420 and a front portion second side 422. In one example, the slot 162 is positioned substantially centrally with respect to the first side surface 304 and the second side surface 306, such that the slot 162 divides the front portion 202 of the battery enclosure into two halves. Alternatively, the slot 162 may not be positioned centrally, such that the front portion first side 420 and front portion second side 422 are of different sizes. In operation, the front portion first side 420 and the front portion second side 422 each house one or more electric battery modules. In one example, the front portion first side 420 and the front portion second side 422 each house a stack of battery modules. In other examples, at least one of the front portion first side 420 and the front portion second side 422 contain or house one or more components of the battery pack 124 other than a battery module, such as a battery controller and/or heating/cooling ducts, for example.

As described above, the slot 162 is configured such that a substantially straight steering column 152 passes through the slot 162. The steering system 150 includes the steering mount 430 that operably couples the steering column 152 to the battery enclosure 128 to support the upper portion of the steering column 152. In some examples, the steering mount 430 couples to the steering column 152 to the top surface 300 of the battery enclosure. The first side mount 452 is attached on the front portion first side 420 at a top end of the slot 162 and the second side mount 454 is attached on the front portion second side 422 on an opposite side of the slot 162 from the first side mount 452. The steering mount 430 allows the steering column 152 to operate within the slot 162 while providing structural support to the steering column 152 within steering system 150. For example, the steering mount 430 may provide support and structural stiffness to the steering column 162. The steering mount 430 is coupled to the battery enclosure 128 at a position that enables the steering column 152 to be received within the slot 162. The steering mount 430 may provide a structural stiffness to the snowmobile handlebars, and in turn, an improved experience to a snowmobile operator. The steering mount 430 may also transfer loads from the steering system 150 to the battery enclosure 128.

Figure 13:
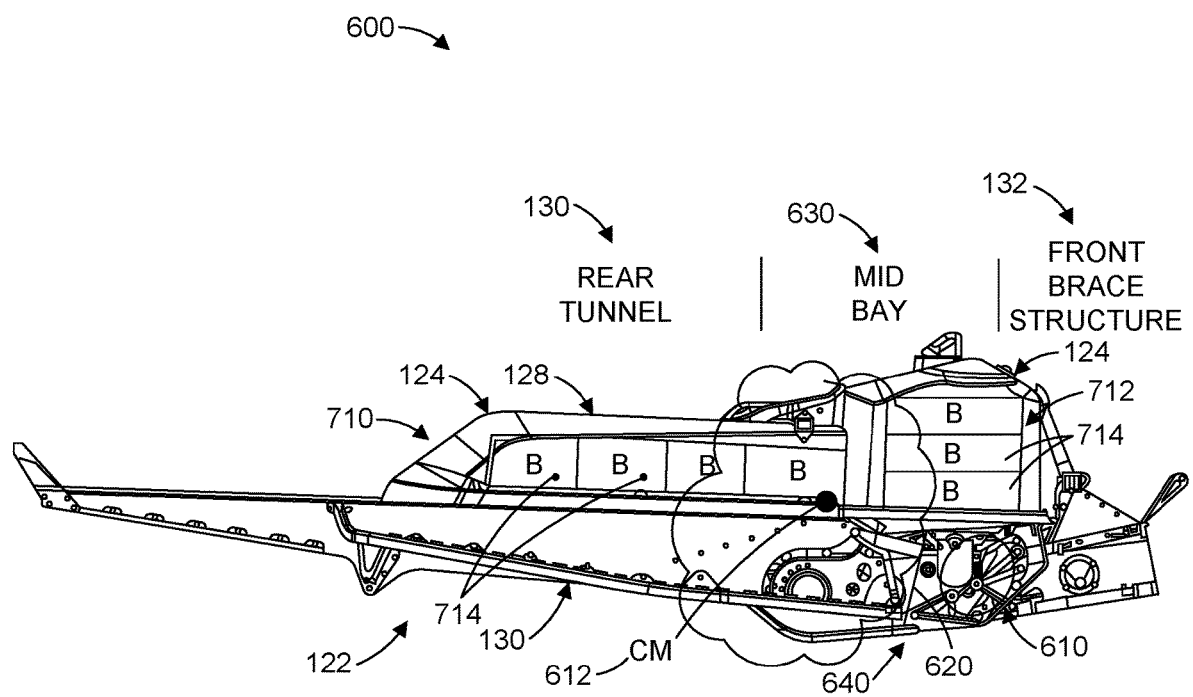
FIG. 13 is a partial side view of a snowmobile, according to one example of the present disclosure.

FIG. 13 is a partial side view of a snowmobile 600, according to one example of the present disclosure. The snowmobile 600 is similar to the snowmobile 120 and snowmobile 500 previously described herein. FIG. 13 depicts the battery pack 124 positioned on the chassis 122. An electric battery is housed within the battery enclosure 128 of the battery pack 124. The electric battery comprises multiple electric battery modules 714. Both the tunnel portion 200 and the front portion 202 of battery enclosure 128 contain the battery modules 714 to power snowmobile 120.

The snowmobile 600 illustrates one example of the relative locations of the battery pack 124 and an electric motor assembly 610 on the snowmobile chassis 122. By arranging the locations of the battery pack 124 and the electric motor assembly 610 appropriately, the location of center of mass 612 can be improved. This provides for a better snowmobile ride experience and better snowmobile performance. For example, too much weight forward can result in poor snowmobile traction and acceleration. With too much weight backward, there can be a loss of snowmobile steering and control. As such, it is desirable to locate the center of mass and weight distribution to improve both snowmobile control and performance.

The snowmobile 600 includes a rear portion of the chassis 122 having rear tunnel 130. A portion of the battery enclosure 128 is mounted on the rear tunnel 130. The electric motor assembly 610 is mounted below the battery enclosure 128 and adjacent a front side 620 of the rear tunnel 130. The chassis 122 further defines a mid-bay 630. The mid-bay 630 is located between the rear tunnel 130 and the front brace structure 132. In some embodiments, the mid-bay 630 may form part of the front brace structure 132. In one example, the electric motor assembly 610 is positioned within the mid-bay 630. The electric motor assembly 610 includes a drive shaft operably aligned with the snowmobile drive transmission 640. The drive transmission 640 may include a drive linkage to drivingly couple to the electric motor assembly 610. In one example, the drive transmission 640 is a belt drive system and/or a chain drive system. As such, it is efficient to have the motor assembly 610 located within the mid-bay 630 in the lower front area of chassis 122. In this configuration, the motor assembly 610 and drive transmission 640 are efficiently mounted right next to each other on the snowmobile chassis 122.

Further examples of the electric motor assembly 610 being within the mid-bay 630 is described in further detail later in this specification.

The battery pack 124 includes a tunnel battery pack 710 and a mid-bay battery pack 712. The tunnel battery pack 710 is generally corresponds to the tunnel portion 200 of the battery pack 124 and the mid-bay battery pack 712 generally corresponds to the front portion 202 of the battery pack 124. Each battery pack 710 and 712 includes a plurality of the battery modules 714. The battery modules 714 are one of the heaviest design elements of snowmobile 600. The location of battery packs 710 and 712, and therefore distribution of the battery modules 714 over the chassis 122, aids in desired weight distribution across the snowmobile 600. The tunnel battery pack 710 is located above the rear tunnel 130 (and below the snowmobile seat). The mid-bay battery pack 712 is located above the front end of rear tunnel 130 within mid-bay 630 and above the electric motor assembly 610. This may provide a shifted and improved location of the center of mass 612, resulting in a snowmobile with improved weight distribution and balance, and overall snowmobile performance.

The battery pack 124 includes the battery enclosure 128 having a lid or cover and floor. The battery cover operates primarily to protect the battery modules and as a structural element to transfer loads from the suspension system 126 to the snowmobile chassis 122. The battery pack floor primarily operates to support the battery modules 714 within the battery pack 124.

FIGS. 14 to 17 illustrate one example of the battery pack 124, including the battery modules 714. For ease of illustration, the battery pack 124 is shown with the battery enclosure lid removed for a view of the internal structure of the battery pack 124.

Figure 14:
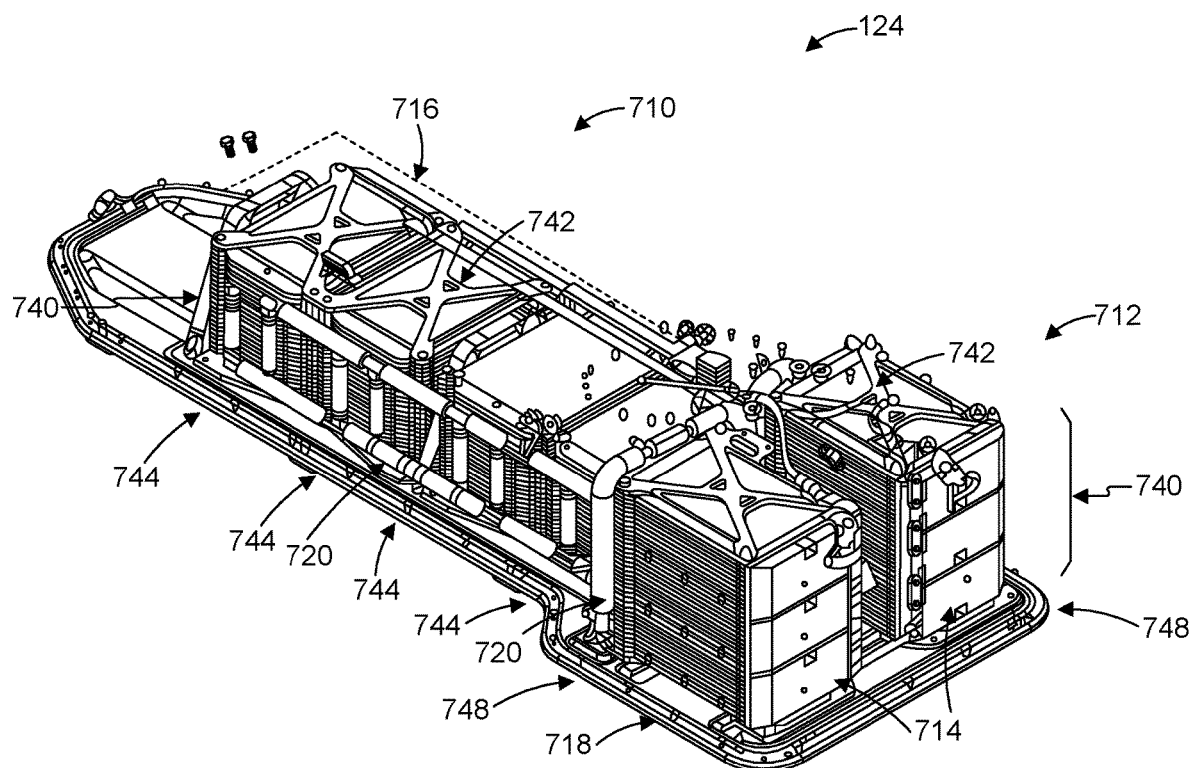
FIG. 14 is a front top perspective view of a battery pack, according to one example of the present disclosure.

FIG. 14 is a front top perspective view of the battery pack 124, according to one example of the present disclosure. FIG. 14 shows the battery modules 714 that make up an electric battery within the battery pack 124. The battery pack 124 includes the battery enclosure 128 that houses the battery modules 714. The battery enclosure 128 includes a battery pack cover or lid 716 (shown removed) and a battery pack support floor 718. The battery pack support floor 718 holds and supports the battery modules 714. Further, the battery modules 714 are securely retained within the battery pack 124 by a battery support structure 720.

The battery pack 124 comprises a plurality of battery stacks 740, where each stack is retained within a cartridge assembly 742. Each battery stack 740 is made up of two or more battery modules and retained within a cartridge assembly 742. In one example, the tunnel battery pack 710 is made up of four battery stacks 744. Each battery stack 744 includes two battery modules 714 stacked together within a cartridge assembly 742. As such, the tunnel battery pack 710 includes eight total battery modules 714. The battery stacks 744 are positioned on the battery pack support floor 718. The battery support structure 720 aids in maintaining each battery stack 744 in a desired location on support floor 718. The battery support structure 720 operates to maintain a desired spacing between individual battery stacks 740, and also maintain spacing between the battery stacks 740 and the battery enclosure.

In one example, a mid-bay battery pack 712 is made up of two battery stacks 748. One battery stack 748 is disposed in the front portion first side 420 and the other battery stack 748 is disposed in the front portion second side 422. Each battery stack 748 includes three battery modules 714 stacked together within a cartridge assembly 742. As such, the mid-bay battery stack 712 includes six total battery modules 714. The battery stacks 748 are positioned on battery pack support floor 718. Battery support structure 720 aids in maintaining each battery stack 748 in a desired location on support floor 718. Battery support structure 720 operates to maintain a desired spacing between individual battery stacks 748, and also maintain spacing between the battery stacks 748 and the battery enclosure 128. In one example, the battery support structure 420 is part of the battery enclosure 128. In one example, the spacing between battery stacks 748 located within mid-bay battery pack 712 is also dependent on the space requirements for slot 162 to accommodate the snowmobile steering column.

In one example, the battery support structure 720 is made of a rigid material, such as a rigid polymeric material. In one example, individual members of battery support structure 720 are generally tubular shaped members.

In one example, each battery module 714 is generally rectangular shaped. The battery modules 714 within the battery stacks 744 are orientated in a direction different than the battery modules 714 positioned within battery stacks 744. In one example, the battery modules 714 within battery stack 744 are orientated perpendicular to an orientation of the battery modules 714 contained within battery stacks 748. In other embodiments, all of the battery modules 714 are oriented in the same direction.

Figure 15:
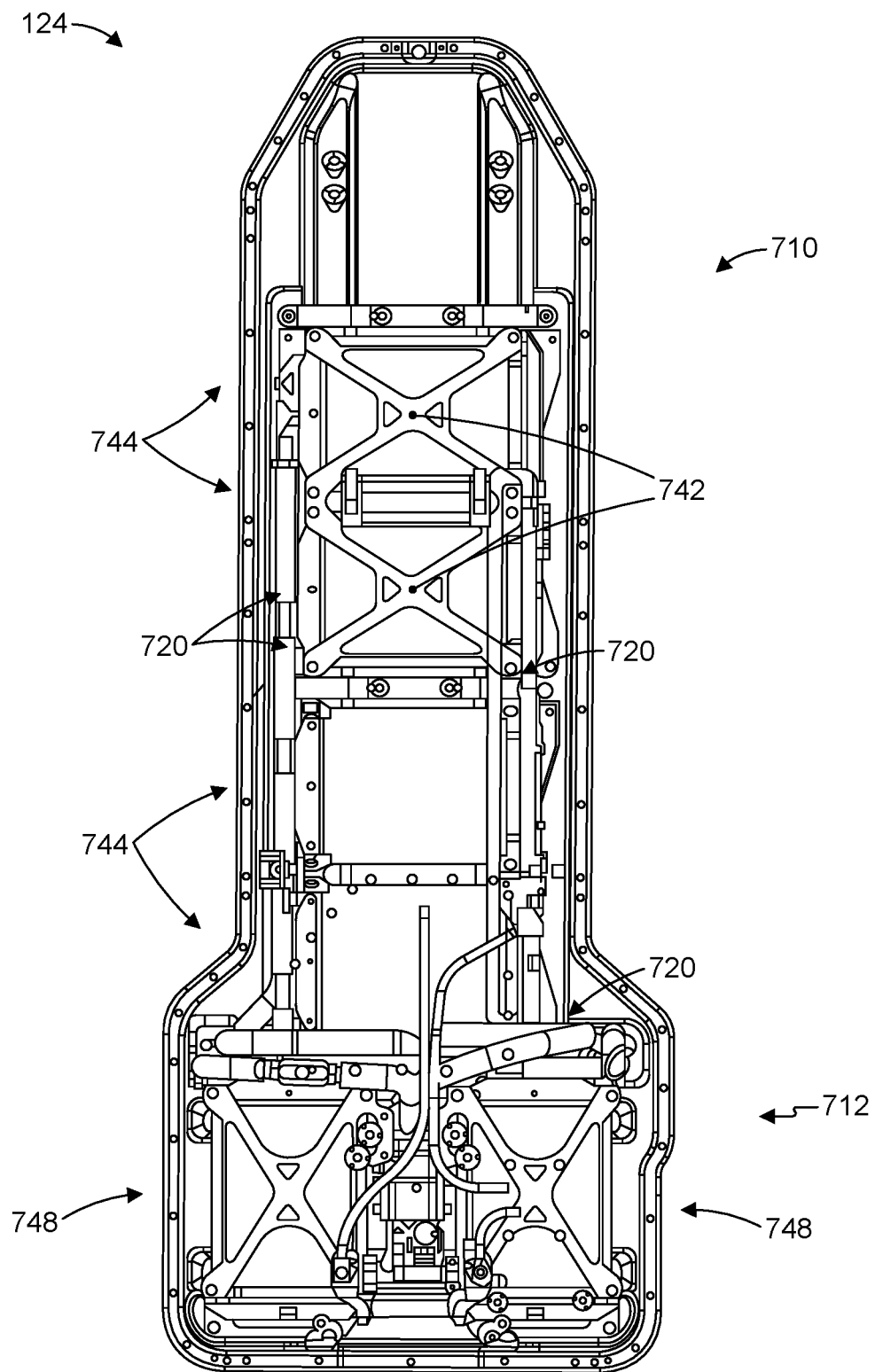
FIG. 15 is a top view of the battery pack of FIG. 14.
Figure 16:
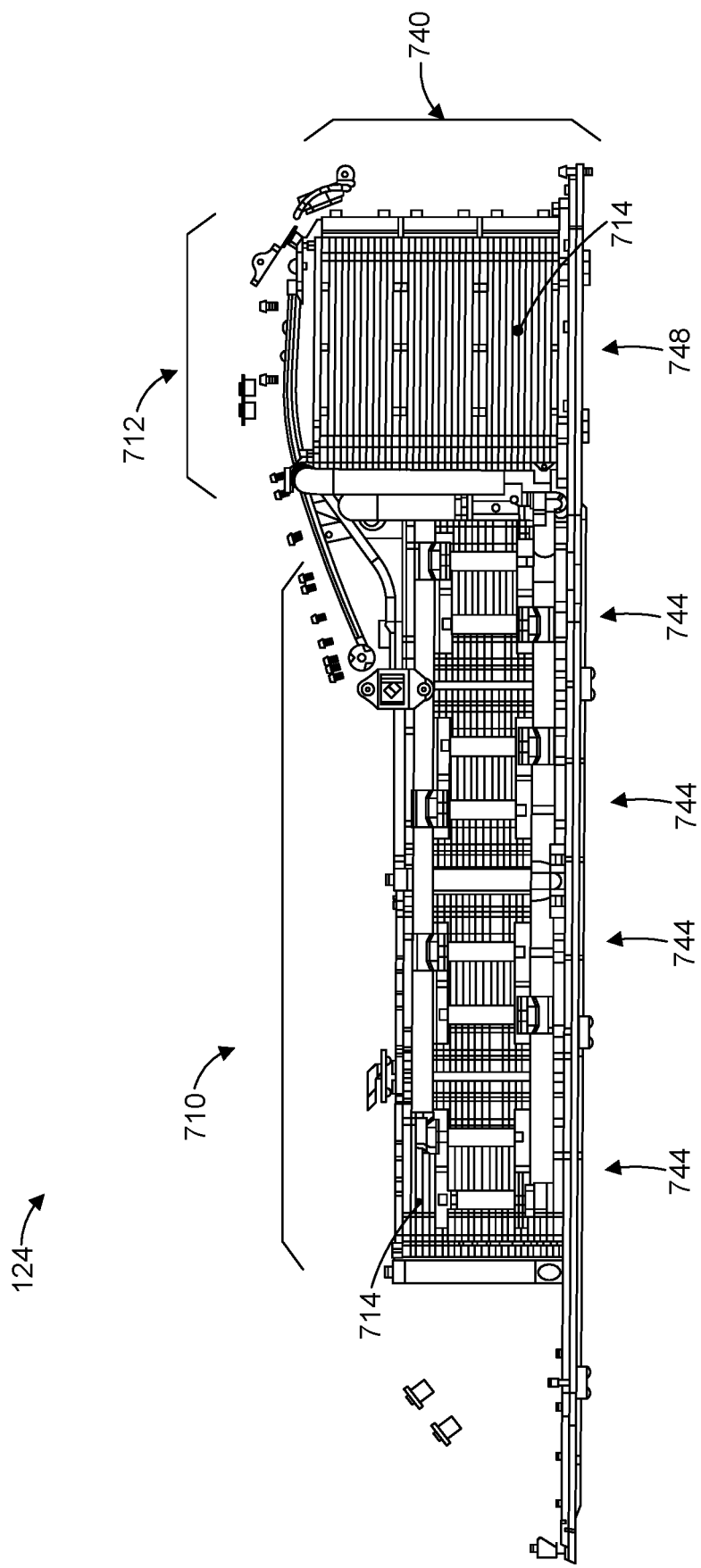
FIG. 16 is a side view of the battery pack of FIG. 14.
Figure 17:
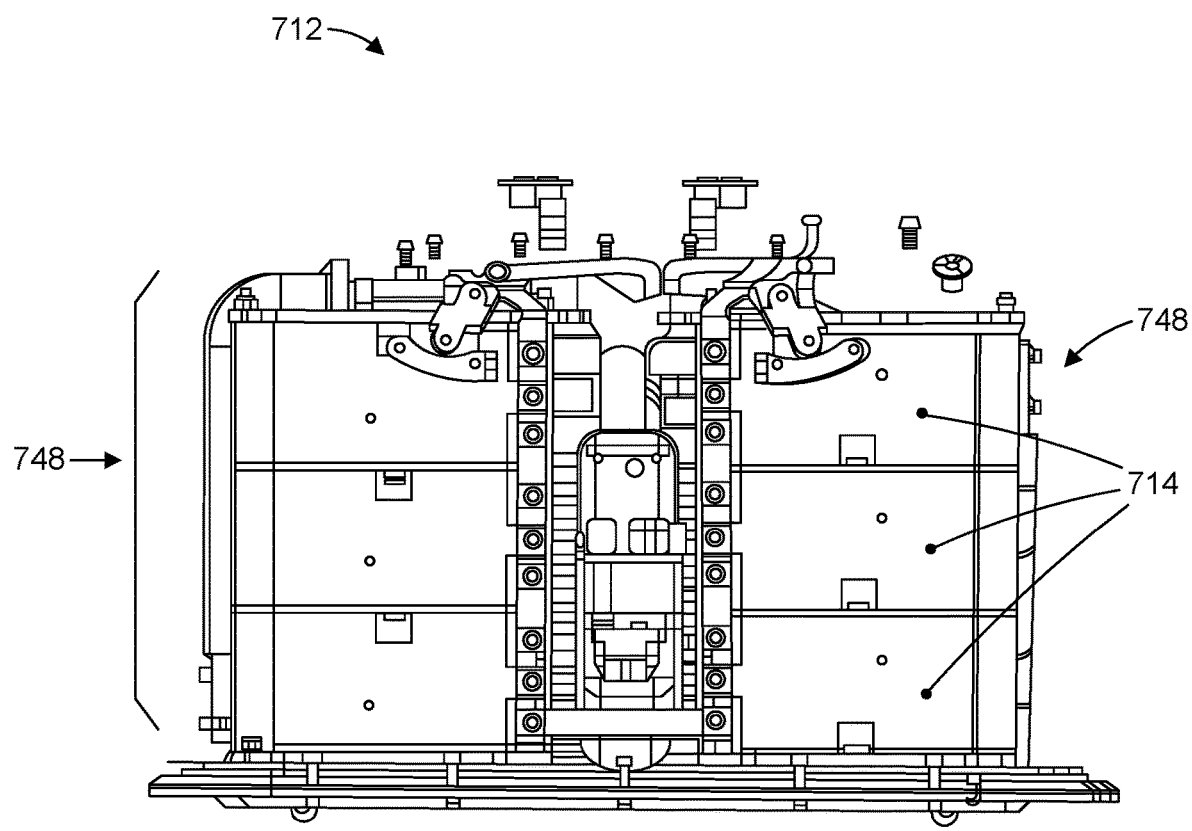
FIG. 17 is a front view of the battery pack of FIG. 14.

FIG. 15 is a top view of the battery pack 124 of FIG. 14, further illustrating the battery support structure 720 and the battery stacks 740. FIG. 16 is a side view of the battery pack 124 further illustrating the tunnel battery pack 710 and the mid-bay battery pack 712. FIG. 17 is a front view of the battery pack 124, further illustrating the mid-bay battery stack 748.

Each battery module 714 contained within the battery pack 124 is made of one or more battery cells. In one example, the battery modules are lightweight 'pouch" battery modules, where each battery module includes two or more pouch battery cells. The battery cells may be prismatic battery cells. In one example, the prismatic battery cells are lithium-ion prismatic battery cells. One or more examples of a battery stack, a battery cartridge, battery module and battery cooling panel assembly, including pouch battery modules and pouch battery cells, suitable for use in the present electric vehicle are disclosed in U.S. patent application Ser. No. 17/091,777 titled Battery Cooling Panel for Electric Vehicles filed Nov. 6, 2020, the entire contents of which are incorporated herein by reference.

In some embodiments, the positions of a battery pack, an electric motor and/or a transmission on a chassis of an electric vehicle are selected to provide a more space-efficient design, better manage loads from the electric motor, and/or to improve the location of the center of mass of the electric vehicle. In one example, an electric vehicle includes a chassis defining a rear portion and a front portion. A transmission may be mounted to a rear portion of the chassis and a battery pack may be mounted on top of the rear portion of the chassis. An electric motor may be mounted below the battery enclosure and between a front side of the rear portion of the chassis and a front end of the electric vehicle. In this way, the transmission and the electric motor may be proximate to each other underneath the battery pack to conserve space.

Further, the electric motor may be positioned generally horizontally relative to the transmission. In one example, the electric vehicle includes a transmission drive shaft and a motor drive shaft spaced apart along a longitudinal axis of the electric vehicle. The motor drive shaft may be coupled to the transmission drive shaft via a drive linkage such as a drive belt, for example. A portion of the drive linkage extending between the transmission drive shaft and the motor drive shaft may be substantially horizontal (e.g., substantially parallel to a longitudinal axis of the electric vehicle).

A transmission plate may be attached to the electric motor to provide structural stability to the electric motor. The transmission plate may be connected at a first end to the rear portion of the chassis and at a second end to the front portion of the chassis in a generally horizontal manner. In this way, the transmission plate may be simply supported along a longitudinal axis of the electric vehicle. The transmission plate may also be supported parallel to the portion of the drive linkage extending between the transmission drive shaft and the motor drive shaft. This configuration of the transmission plate may improve rigidity and enable the transmission plate to better manage tensile and rotational loads from the electric motor and drive belt.

Figure 18:
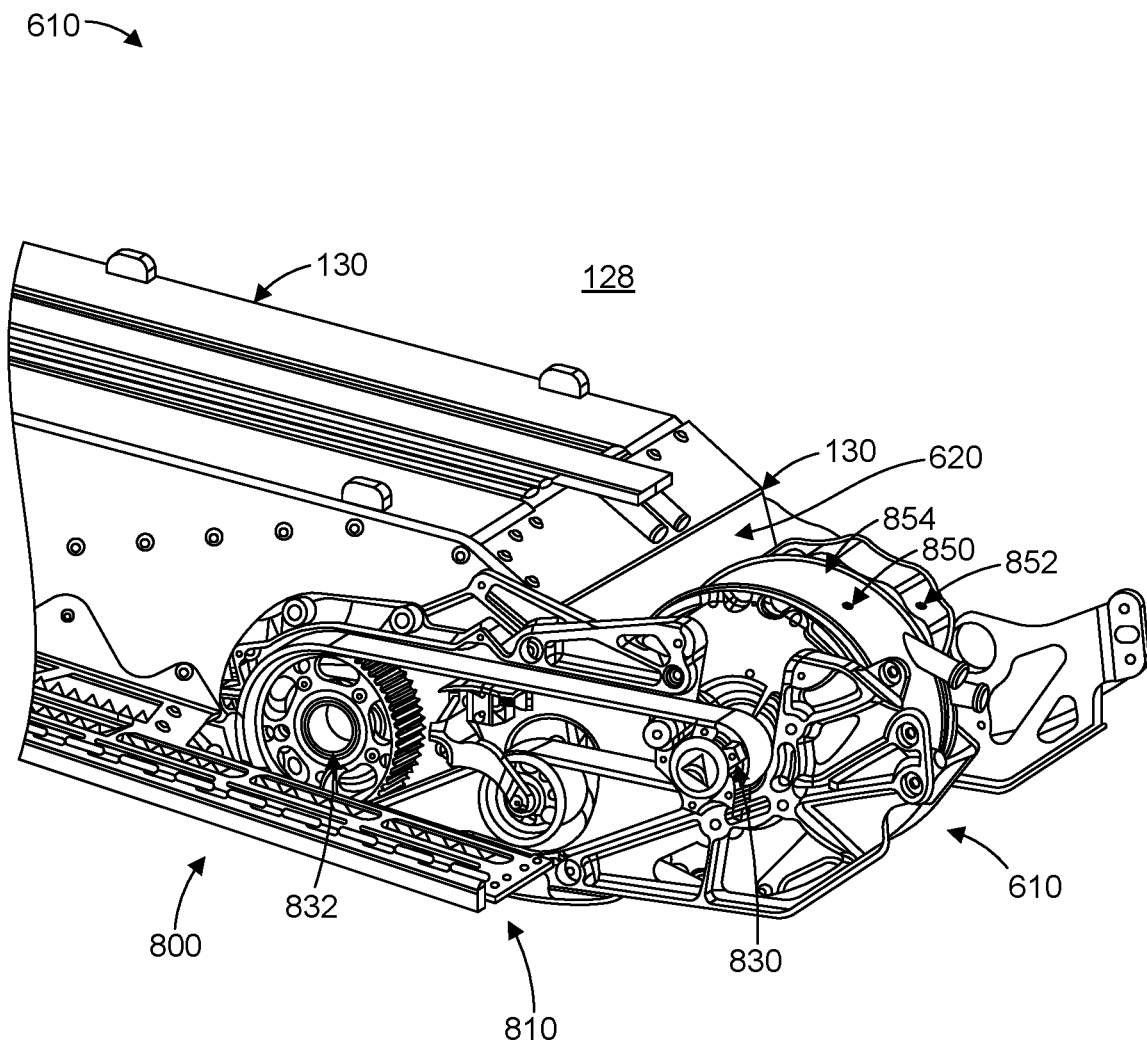
FIG. 18 is a partial perspective view of an electric motor assembly, according to one example of the present disclosure.

FIGS. 18 to 22 illustrate one example of an electric motor assembly 610. FIG. 18 is a partial perspective view of the electric motor assembly 610 positioned within a snowmobile. The electric motor assembly 610 is mounted below the battery enclosure 128 and adjacent to a front side 620 of the rear tunnel 130. In this way, the electric motor assembly 610 is positioned in front of the rear tunnel 130. The motor assembly 610 is also positioned generally horizontally relative to the longitudinally extending rear tunnel 130.

Mounting the electric motor assembly 610 below the battery pack 124 can help provide more space for the battery pack 124. For example, the battery pack 124 may extend along the length of the rear tunnel 130 without being limited in size by the electric motor assembly 610 and/or other components. This may enable larger battery packs with greater capacities to be used. Further, mounting the battery pack 124 on top of the rear tunnel 130 may shift the center of mass of the snowmobile towards the rear suspension, which may improve traction and overall ride quality.

The snowmobile chassis 122 includes the rear tunnel 130. The chassis 122 also includes a mid-bay and the front brace structure 132, the mid-bay being located between the rear tunnel 130 and the front brace structure 132. The electric motor assembly 610 is positioned within the mid-bay.

The electric motor assembly 610 is shown coupled to a drive transmission 800. The drive transmission 800 may transfer power from the electric motor assembly 610 to an endless track of the snowmobile. In one example, the electric motor assembly 610 is coupled to the drive transmission 800 via a belt drive system 810. A chain drive system may also or instead be used. The electric motor assembly 610 is positioned substantially horizontally relative to the drive transmission 800. For example, the electric motor assembly 610 and the drive transmission 800 may occupy the same horizontal plane and/or be aligned along a longitudinal axis of the snowmobile.

Figure 19:
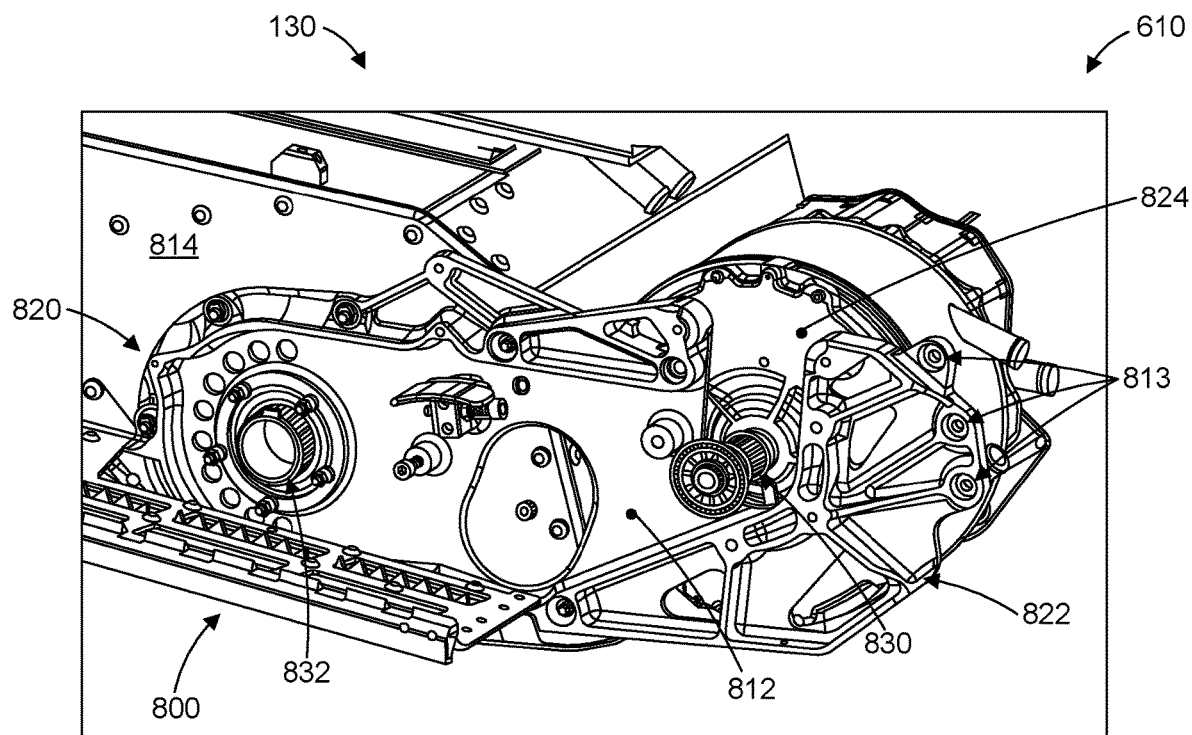
FIG. 19 is an enlarged partial perspective view of the electric motor assembly of FIG. 18.

FIG. 19 is an enlarged partial perspective view of the motor assembly 610. FIG. 19 further illustrates the position of electric motor assembly 610 on the chassis 122. A transmission plate 812 is positioned between the belt drive system 810 and the motor assembly 610. In one example, the transmission plate 812 is positioned substantially parallel to a first side edge 814 of the rear tunnel 130. The transmission plate 812 includes a first end 820 and a second end 822, which spaced apart along a substantially horizontal longitudinal axis of the snowmobile. The transmission plate 812 is attached at the first end 820 to the first side edge 814 of rear tunnel 130, and at the second end 822 to a component of the front brace structure 132. In this way, the transmission plate 812 is simply supported by the chassis 122 at its first end 820 and its second end 822. Additionally, the transmission plate 812 is attached to a front plate 824 of the motor assembly 610. The second end 822 of the transmission plate 812 is coupled to the front brace structure at connection points 813, which may be bolt holes that correspond to bolt holes on the font brace structure 132 to form a rigid bolted connection. A rigid bolted connection may also be implemented between the first end 820 of the transmission plate 812 and the first side edge 814 of rear tunnel 130, and/or between the transmission plate 812 and the front plate 824 of the motor assembly 610. Other forms of rigid connections, including welds, snap fit connections and/or friction fit connections, for example, may also be implemented in the connections to the transmission plate 812.

The configuration and coupling of the transmission plate 812 to the chassis 122 may provide a rigid support for the motor assembly 810 and improved handling of transmission loads from the belt drive system 810. For example, tensile and rotational loads from the motor assembly 610 and belt drive system 810 may be managed without bending or other deformation of the transmission plate 812. The configuration and coupling of the transmission plate 812 to the chassis 122 may also allow for a lighter transmission plate since the transmission plate 812 is supported at both ends. In contrast, if only one end of the transmission plate 812 is connected to the chassis 122, the significant bending could occur do to loads from the motor assembly 610 and belt drive system 810.

Figure 20:
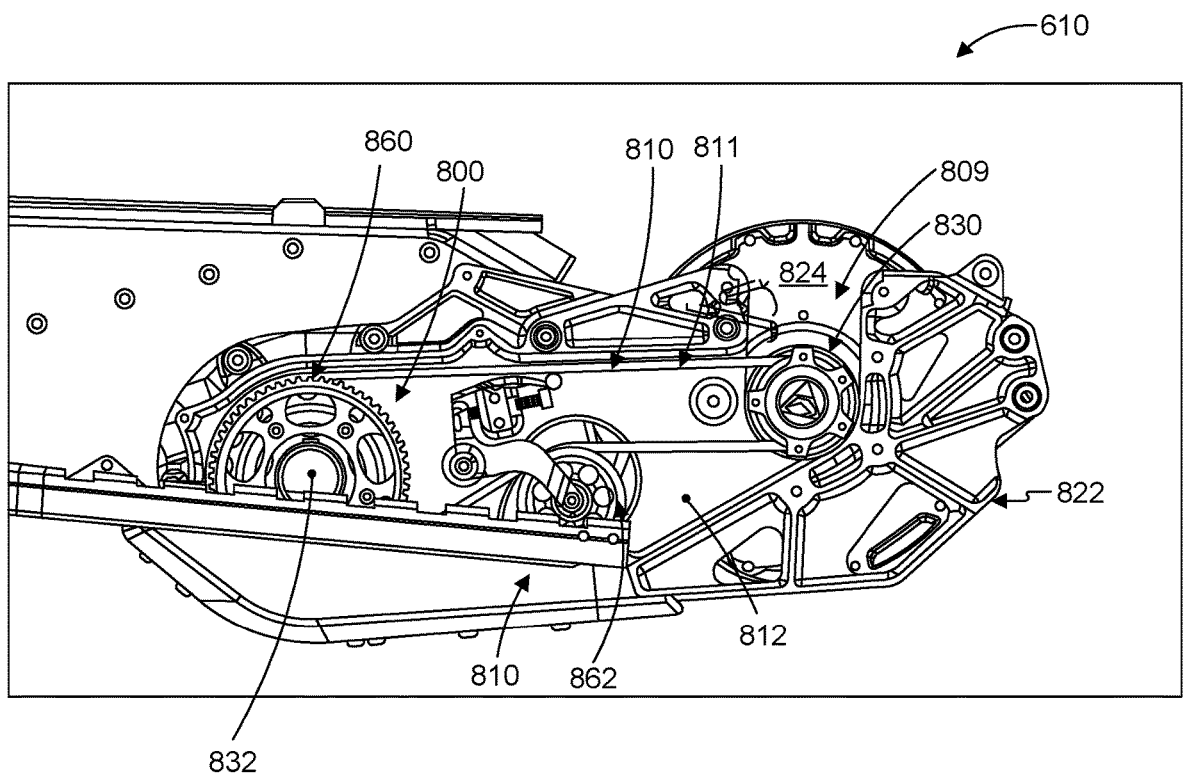
FIG. 20 is a partial side view of the electric motor assembly of FIG. 18.

FIG. 20 is a partial side view of the electric motor assembly 610. In one example, the electric motor assembly 610 is mounted proximate to the drive transmission 800 by the transmission plate 812. The electric motor assembly 610 includes a motor drive shaft 830. The drive transmission 800 includes a transmission drive shaft 832. The motor drive shaft 830 and the transmission drive shaft 832 extend parallel to each other along transverse axes. The transmission drive shaft 832 and the motor drive shaft 830 are spaced apart from each other along a longitudinal axis of the electric vehicle. The motor drive shaft 830 is operably coupled to the transmission drive shaft 832 via the belt drive system 810.

The transmission plate 812 includes a U-shaped slot 809 (or opening) that extends downwards from a top side of the transmission plate 812. The electric motor assembly 610 drive shaft 830 extends through the U-shaped slot 809. In one example, the electric motor assembly 610 is attached to both sides of the U-shaped slot 809 at an interior of the transmission plate 812 such that the motor drive shaft 830 extends through the U-shaped slot 809 from an interior to an exterior of the U-shaped slot. The U-shaped slot 809 may aid in mounting of the motor assembly 610 to the chassis 122 by enabling the motor assembly 610 to be lowered downwards into position in the mid-bay, with the drive shaft 830 positioned within the U-shaped slot 809. The electric motor assembly 610 may then be coupled to the transmission plate 812. An additional plate (not shown) may cover the U-shaped slot 809 once the motor assembly 610 is positioned within the snowmobile 120 that may aid in managing torque loads from the motor.

In one example, the electric motor assembly 610 includes an electric motor drive gear coupled to the motor drive shaft 830 and the drive transmission 800 includes a transmission gear 860 coupled to the transmission drive shaft 832. The belt drive system 810 includes a drive belt 811. The drive belt 811 is connected between the electric motor drive gear and the transmission gear 860. In other embodiments, another drive linkage such as a drive chain, for example, may be connected between the electric motor drive gear and the transmission gear 860. In some examples, an angle of a portion of the drive belt 811 extending between the electric motor drive gear and the transmission gear 860 with respect to the substantially horizontal longitudinal axis of the snowmobile is equal to or less than 20% (or 11.3 degrees) and equal to or greater than −20% (or −11.3 degrees). As illustrated, this portion of the drive belt 811 is a top portion of the drive belt 811 connected directly between the electric motor drive gear and the transmission gear 860. A drive belt idler pulley 862 contacts a bottom surface of the bottom portion of the drive belt 811.

In other embodiments, the drive belt idler pulley 862 may contact a top portion of the drive belt 811 and the bottom portion of the drive belt 811 may be connected directly between the electric motor drive gear and the transmission gear 860. An angle of the bottom portion of the drive belt 811 with respect to a substantially horizontal longitudinal axis of the snowmobile may be equal to or less than 20% (or 11.3 degrees) and equal to or greater than −20% (or −11.3 degrees).

Advantageously, positioning the electric motor assembly 610 substantially horizontally to the drive transmission 810 may reduce the distance between the electric motor assembly 610 and the drive transmission 810, thereby potentially providing an efficient utilization of space and/or a reduction in the complexity and cost of the belt drive system 810. Further, positioning the electric motor assembly 610 and the drive transmission 810 such that the top portion of the drive belt 811 extends substantially parallel a horizontal longitudinal axis of the snowmobile helps ensure that some loads exerted on the transmission plate 812 are also along the horizontal longitudinal axis of the snowmobile. The transmission plate 812 is supported at either end 820, 822 along this longitudinal axis, and may therefore better manage loads from the belt drive system 810 and electric motor assembly 610.

Figure 21:
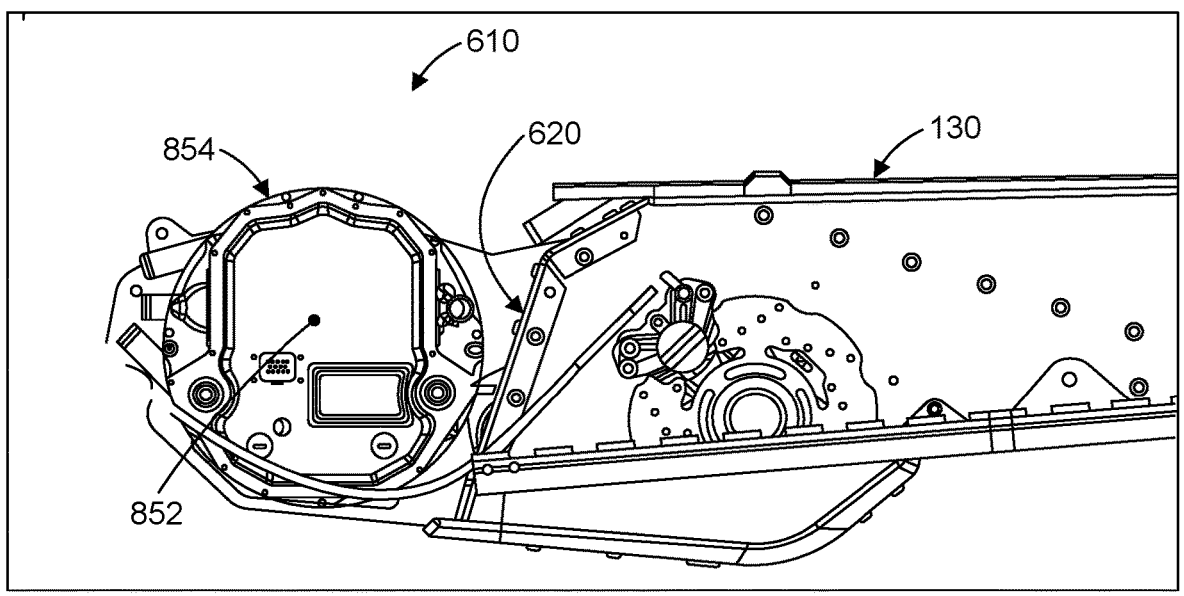
FIG. 21 is another partial side view of the electric motor assembly of FIG. 18.
Figure 22:
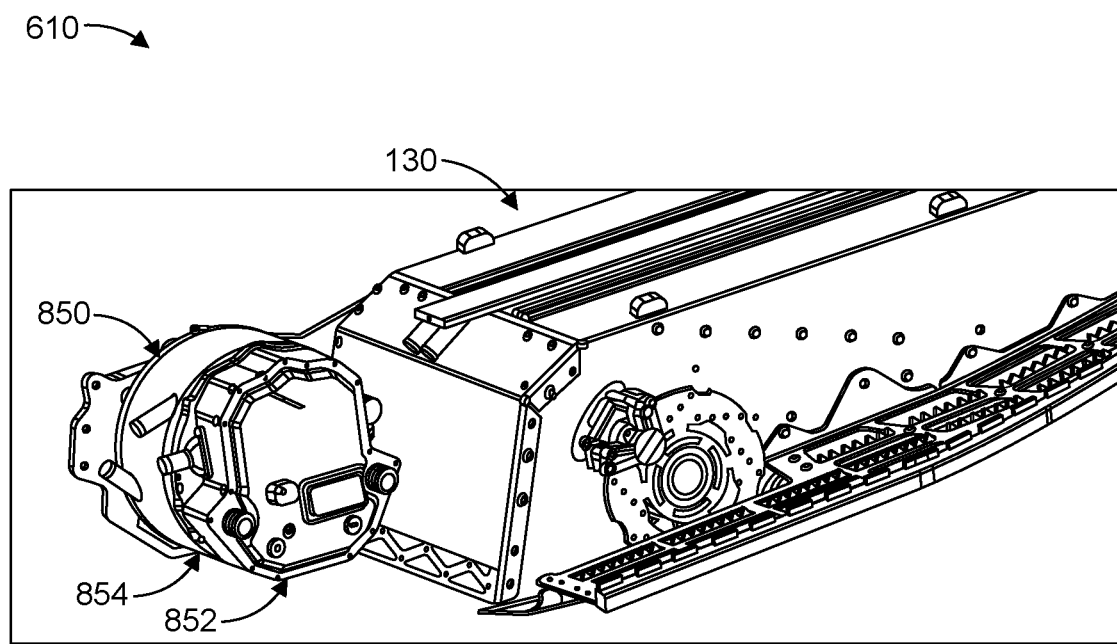
FIG. 22 is a partial perspective view of the electric motor assembly of FIG. 18.

FIG. 21 and FIG. 22 further illustrate the electric motor assembly 610. FIG. 21 is another partial side view of the electric motor assembly 610, and FIG. 22 is a partial perspective view of the electric motor assembly 610. The electric motor assembly 610 is shown positioned immediately adjacent the front side 620 of rear tunnel 130. In the embodiment shown, the electric motor assembly 610 does not extend the entire width of the rear tunnel 130. As such, the electric motor 850 may remain substantially unsupported, or supported by sheet metal with minimal structural support, at the end opposite from the motor drive shaft 830. The electric motor assembly 610 incudes a motor 850 coupled to an inverter 852. The inverter 852 is directly coupled to the motor 850, and contained within a common housing 854. The electric motor assembly 610 having the inverter 852 integrated into the same housing provides for efficient locating of the motor assembly 610 in the chassis mid-bay in front of the rear tunnel 130. One motor assembly including a motor coupled to an inverter, suitable for use in the present electric vehicle, is disclosed in U.S. Patent Application No. 63/135,466, titled DRIVE UNIT FOR ELECTRIC VEHICLE, filed Jan. 8, 2021, the entire contents of which are incorporated herein by reference.

Although specific examples have been illustrated and described herein, a variety of alternate and/or equivalent implementations may be substituted for the specific examples shown and described without departing from the scope of the present disclosure. This disclosure is intended to cover any adaptations or variations of the specific examples discussed herein.

It should be noted that, as used herein, the phrase "at least one of A and B" includes any combination of A and/or B. For example, the phrase "at least one of A and B" encompasses only A, only B, and A and B together. Similar comments apply to the phrase "at least two of A, B and C".

Various example embodiments of the present disclosure will now be provided.

Example embodiment 1: An electric vehicle comprising, an electric motor, a battery pack comprising: one or more battery modules for providing power to the electric motor; and a battery enclosure housing the one or more battery modules, the battery enclosure being a structural element of the electric vehicle for receiving loads from at least two of a suspension system, a seat and a steering system of the electric vehicle.

Example embodiment 2: The electric vehicle of example embodiment 1, the battery enclosure transferring the loads received, at least partially, to a center of mass of the electric vehicle.

Example embodiment 3: The electric vehicle of any one of example embodiments 1 or 2, the battery enclosure transferring the loads received, at least partially, to a chassis of the electric vehicle.

Example embodiment 4: The electric vehicle of any one of example embodiments 1 to 3, wherein the battery enclosure defines a front portion and a rear portion, the front portion receiving loads from a front suspension of the electric vehicle.

Example embodiment 5: The electric vehicle of any one of example embodiments 1 to 3, wherein the battery enclosure defines a front portion and a rear portion, the front portion receiving loads from the steering system and the rear portion receiving loads from the seat.

Example embodiment 6: The electric vehicle of any one of example embodiments 4 or 5, wherein the electric vehicle comprises a chassis defining a tunnel portion and a front brace structure, the tunnel portion connected to the rear portion of the battery enclosure and the front brace structure connected to the front portion of the battery enclosure.

Example embodiment 7: The electric vehicle of any one of example embodiments 1 to 6, wherein the electric vehicle is a snowmobile.

Example embodiment 8: A battery enclosure for an electric vehicle, the battery enclosure being a structural element of the electric vehicle and comprising: a rear portion adapted for connection to a rear portion of a chassis of the electric vehicle, the rear portion of the battery enclosure configured to receive loads from a seat of the electric vehicle; and a front portion adapted for connection to a front portion of the chassis of the electric vehicle, the front portion of the battery enclosure configured to receive loads from a front suspension of the electric vehicle.

Example embodiment 9: The battery enclosure of example embodiment 8, wherein the battery enclosure is configured to transfer loads received from the seat and the front suspension, at least partially, to a center of mass of the electric vehicle.

Example embodiment 10: The battery enclosure of one of example embodiments 8 or 9, wherein the battery enclosure is configured to transfer loads received from the seat and the front suspension, at least partially, to a chassis of the electric vehicle.

Example embodiment 11: The battery enclosure of example embodiment 9, the front portion further adapted for receiving loads from a steering system of the electric vehicle and transferring those loads, at least partially, to a center of mass of the electric vehicle.

Example embodiment 12: The battery enclosure of any one of example embodiments 8 to 11, wherein the electric vehicle is a snowmobile.

Example embodiment 13: The battery enclosure of example embodiment 12, wherein the rear portion of the battery enclosure is adapted for connection to a tunnel of the snowmobile, and the front portion of the battery enclosure is adapted for connection to a front brace structure of the snowmobile.

Example embodiment 14: A snowmobile comprising: a chassis that comprises: a rear tunnel; and a front brace structure adapted to receive loads from a front suspension system of the snowmobile; a battery enclosure defining a tunnel portion and a front portion, the tunnel portion being connected to the rear tunnel of the chassis and the front portion being connected to the front brace structure of the chassis; wherein the battery enclosure receives loads from the front suspension system of the snowmobile through the front brace structure and transfers the loads from the front suspension system to at least one of the rear tunnel and a center of mass of the electric vehicle through a body of the battery enclosure.

Example embodiment 15: The snowmobile of example embodiment 14, wherein the battery enclosure is further connected to the front brace structure at a bottom surface.

Example embodiment 16: The snowmobile of one of example embodiments 14 or 15, wherein a steering mount is connected to the front portion of the battery enclosure for connection to a steering column, the steering mount transferring loads from the steering column into the body of the battery enclosure.

Example embodiment 17: The snowmobile of any one of example embodiments 14 to 16, further comprising a seat connected to the tunnel portion of the battery enclosure, wherein loads from the seat are received by and transferred into the body of the battery enclosure.

Example embodiment 18: The snowmobile of any one of example embodiments 14 to 17, wherein the front portion of the battery enclosure defines a first height and the tunnel portion of the battery enclosure defines a second height, the first height being greater than the second height.

Example embodiment 19: The snowmobile of any one of example embodiments 14 to 18, wherein the front portion of the battery enclosure defines a first width and the tunnel portion of the battery enclosure defines a second width, the first width being greater than the second width.

Example embodiment 20: The snowmobile of any one of example embodiments 14 to 19, wherein the front suspension system comprises at least one coil over spring and damper assembly.

Example embodiment 21: The snowmobile of example embodiment 20, wherein the at least one coil over spring and damper assembly is connected between a pair of skis and the front brace structure.

Example embodiment 22: The snowmobile of any one of example embodiments 14 to 21, wherein the battery enclosure comprises a carbon fiber composite material.

Example embodiment 23: The snowmobile of any one of example embodiments 14 to 21, wherein the battery enclosure comprises an injection molded glass fiber reinforced plastic material.

Example embodiment 24. The snowmobile of any one of example embodiments 14 to 23, wherein the tunnel portion of the battery enclosure is connected to the rear tunnel of the chassis via two or more right side blocks and two or more left side blocks.

Example embodiment 25: The snowmobile of any one of example embodiments 14 to 24, wherein the battery enclosure has a stiffness that is within a range that is equal to or greater than 10 gigapascal (Gpa) and equal to or less than 70 Gpa.

Example embodiment 26: The snowmobile of any one of example embodiments 14 to 25, wherein the battery enclosure comprises a cover and a floor.

Example embodiment 27: The snowmobile of any one of example embodiments 14 to 26, further comprising an electric motor, wherein the battery enclosure houses at least two electric battery modules for supplying electricity to the electric motor.

Example embodiment 28: The snowmobile of example embodiment 27, wherein the at least two electric battery modules comprise one or more pouch battery cells.

Example embodiment 29: A battery enclosure for an electric snowmobile, the battery enclosure comprising: a tunnel portion adapted for connection to a rear tunnel of a snowmobile chassis; a front portion adapted for connection to a front brace structure of the snowmobile chassis, wherein the battery enclosure is configured to receive loads from a front suspension system of the snowmobile through the front brace structure and transfers the loads from the front suspension system to at least one of the rear tunnel and a center of mass of the electric vehicle through a body of the battery enclosure.

Example embodiment 30: The battery enclosure of example embodiment 29, configured for connection to a steering column via a steering mount for receiving loads from the steering column into the body of the battery enclosure.

Example embodiment 31: The battery enclosure of example embodiment 29, configured for connection to a seat of the electric vehicle for receiving loads from the seat into the body of the battery enclosure.

Example embodiment 32: The battery enclosure of any one of example embodiments 29 to 31, wherein the front portion of the battery enclosure defines a first height and the tunnel portion of the battery enclosure defines a second height, the first height being greater than the second height.

Example embodiment 33: The battery enclosure of any one of example embodiments 29 to 32, wherein the front portion of the battery enclosure defines a first width and the tunnel portion of the battery enclosure defines a second width, the first width being greater than the second width.

Example embodiment 34: The battery enclosure of any one of example embodiments 29 to 33, wherein the battery enclosure comprises a carbon fiber composite material.

Example embodiment 35: The battery enclosure of any one of example embodiments 29 to 34, wherein the battery enclosure comprises an injection molded glass fiber reinforced plastic material.

Example embodiment 36: The battery enclosure of any one of example embodiments 29 to 35, wherein the battery enclosure has a stiffness that is within a range that is equal to or greater than 10 gigapascal (Gpa) and equal to or less than 70 Gpa.

Example embodiment 37: The battery enclosure of any one of example embodiments 29 to 36, wherein the battery enclosure comprises a cover and a floor.

Example embodiment 38: A straddle-seat electric vehicle, comprising; a chassis including a suspension system; and a battery pack configured as a structural element that receives loads from the suspension system.

Example embodiment 39: The straddle-seat electric vehicle of example embodiment 38, the battery pack comprising a battery enclosure coupled to the suspension system for transferring, at least partially, loads from the suspension system through a body of the battery enclosure to the chassis.

Example embodiment 40: The straddle-seat electric vehicle of example embodiment 38, comprising a brace structure that transfers loads between the suspension system and the battery enclosure.

Example embodiment 41: The straddle-seat electric vehicle of example embodiment 38, further comprising a straddle seat, the straddle seat being mounted directly to the battery pack.

Example embodiment 42: The straddle-seat electric vehicle of example embodiment 39, wherein the straddle-seat vehicle is a snowmobile.

Example embodiment 43: An electric vehicle, comprising: a battery pack having a battery enclosure, the battery enclosure defines a slot that extends downwards from a top surface of the battery enclosure for receiving a steering column of the electric vehicle.

Example embodiment 44: The electric vehicle of example embodiment 43, wherein the slot extends downwards from the top surface of the battery enclosure to a front side surface of the battery enclosure.

Example embodiment 45: The electric vehicle of example embodiment 43, wherein the slot extends downwards from the top surface of the battery enclosure to a bottom surface of the battery enclosure.

Example embodiment 46: The electric vehicle of example embodiment 43, wherein the width of the slot varies along a length, a top end of the slot being wider than a bottom end of the slot.

Example embodiment 47: The electric vehicle of example embodiment 43, wherein the slot divides the front portion of the battery enclosure into a first side and a second side, wherein each of the first side and second side is suitable for housing one or more electric battery modules.

Example embodiment 48: The electric vehicle of example embodiment 43, wherein the slot is positioned substantially centrally with respect to a first side wall and a second side wall of the battery enclosure.

Example embodiment 49: The electric vehicle of example embodiment 43, wherein the battery enclosure is a structural component suitable for receiving loads from the steering column and transferring the loads to a chassis.

Example embodiment 50: The electric vehicle of example embodiment 43, wherein a straight steering column passes through the slot.

Example embodiment 51: A snowmobile, comprising: a chassis that comprises: a rear tunnel; and a front brace structure; a battery enclosure defining a tunnel portion and a front portion, the tunnel portion being connected to the rear tunnel of the chassis and the front portion being connected to the front brace structure, wherein the front portion of the battery enclosure defines a slot that extends downwards from a top surface of the battery enclosure for receiving a steering column of the snowmobile.

Example embodiment 52: The snowmobile of example embodiment 51, wherein the slot extends downwards from the top surface of the battery enclosure to a front side surface of the battery enclosure.

Example embodiment 53: The snowmobile of example embodiment 51, wherein the slot extends downwards from the top surface of the battery enclosure to a bottom surface of the battery enclosure.

Example embodiment 54: The snowmobile of example embodiment 51, wherein the slot defines a first side wall, a second side wall and a bottom surface, wherein the bottom surface of the slot extends at an angle of between 30-60 degrees with respect to a substantially horizontal longitudinal axis of the snowmobile.

Example embodiment 55: The snowmobile of example embodiment 51, wherein a width of the slot is between 30 millimeters (mm) and 60 mm.

Example embodiment 56: The snowmobile of example embodiment 55, wherein the width of the slot varies along a length, a top end of the slot being wider than a bottom end of the slot.

Example embodiment 57: The snowmobile of example embodiment 51, wherein the slot divides the front portion of the battery enclosure into a first side and a second side, wherein each of the first side and second side is suitable for housing one or more electric battery modules.

Example embodiment 58: The snowmobile of example embodiment 51, wherein the slot is positioned substantially centrally with respect to a first side wall and a second side wall of the battery enclosure.

Example embodiment 59: The snowmobile of example embodiment 51, wherein the battery enclosure is a structural component suitable for receiving loads from the steering column and transferring the loads to the chassis.

Example embodiment 60: The snowmobile of example embodiment 51, wherein a straight steering column passes through the slot.

Example embodiment 61: The snowmobile of example embodiment 51, wherein a top of the steering column is above the top surface of the battery enclosure and a bottom of the steering column is below a bottom surface of the battery enclosure and is attached to a steering mechanism that controls a direction of a right front ski and a left front ski for the snowmobile.

Example embodiment 62: The snowmobile of example embodiment 51, wherein an upper steering mount is attached to the top surface of the battery enclosure and is configured to support an upper portion of the steering column and provide a stiffness to the upper portion of the steering column.

Example embodiment 63: The snowmobile of example embodiment 62, wherein the battery enclosure has a stiffness that is within a range that is equal to or greater than 10 gigapascal (Gpa) and equal to or less than 70 Gpa, and wherein the stiffness of the battery enclosure corresponds with the stiffness that the upper steering mount provides to the upper portion of the steering column.

Example embodiment 64: The snowmobile of example embodiment 62, wherein the upper steering mount comprises a right upper steering mount and a left upper steering mount attached to a pipe having an axis aligned with an axis of the steering column, and wherein the steering column passes through the pipe and is supported by the pipe.

Example embodiment 65: The snowmobile of example embodiment 51, wherein the steering column passes through the slot at an angle with respect to an axis of the steering column and a substantially horizontal longitudinal axis of the snowmobile that is equal to or greater than 30 degrees and equal to or less than 60 degrees.

Example embodiment 66: The snowmobile of example embodiment 51, wherein the slot is centered between a right side wall and a left side wall of the front portion of the battery enclosure, and wherein a right side stack of one or more batteries are between a first side wall of the slot and a first side wall of the front portion of the battery enclosure, and wherein a left side stack of one or more batteries are between a second side wall of the slot and a second side wall of the front portion of the battery enclosure.

Example embodiment 67: The snowmobile of example embodiment 51, wherein the front portion of the battery enclosure has a width in a direction transverse to a substantially horizontal longitudinal axis of the snowmobile in a direction between the front end and the back end of the snowmobile that is greater than a width of the tunnel portion of the battery enclosure, and wherein the tunnel portion of the battery enclosure includes a row of one or more batteries aligned along the substantially horizontal longitudinal axis of the snowmobile between the front end and the rear end of the snowmobile.

Example embodiment 68: A battery enclosure for an electric vehicle, comprising: a rear portion; and a front portion, the front portion of the battery enclosure defining a slot that extends downwards from a top surface of the battery enclosure for receiving a steering column of the electric vehicle.

Example embodiment 69: The snowmobile of example embodiment 68, wherein the slot extends downwards from the top surface of the battery enclosure to a front side surface of the battery enclosure.

Example embodiment 70: The snowmobile of example embodiment 68, wherein the slot extends downwards from the top surface of the battery enclosure to a bottom surface of the battery enclosure.

Example embodiment 71: The battery enclosure of example embodiment 68, wherein the slot defines a first side wall, a second side wall and a bottom surface, wherein the bottom surface of the slot extends at an angle of between 30-60 degrees with respect to a substantially horizontal longitudinal axis of the electric vehicle.

Example embodiment 72: The battery enclosure of example embodiment 68, wherein a width of the slot is between 30 millimeters (mm) and 60 mm.

Example embodiment 73: The battery enclosure of example embodiment 68, wherein the slot divides the front portion of the battery enclosure into a first side and a second side, wherein each of the first side and second side is suitable for housing electric battery modules.

Example embodiment 74: The battery enclosure of example embodiment 68, wherein the slot is positioned substantially centrally with respect to a first side wall and a second side wall of the battery enclosure.

Example embodiment 75: The battery enclosure of example embodiment 68, wherein the battery enclosure has a stiffness that is within a range that is equal to or greater than 10 gigapascal (Gpa) and equal to or less than 70 Gpa.

Example embodiment 76: The battery enclosure of example embodiment 68, wherein the tunnel portion of the battery enclosure includes a row of one or more batteries in a direction between the front portion of the battery enclosure and the tunnel portion of the battery enclosure.

Example embodiment 77: The battery enclosure of example embodiment 68, wherein the battery enclosure comprises a carbon fiber composite material.

Example embodiment 78: The battery enclosure of example embodiment 68, wherein the battery enclosure comprises an injection molded glass fiber reinforced plastic material.

Example embodiment 79: The battery enclosure of example embodiment 68, wherein the electric vehicle is a snowmobile.

Example embodiment 81: An electric vehicle, comprising: a chassis defining a rear portion and a front portion; a transmission mounted to a rear portion of the chassis; a battery enclosure mounted on top of the rear portion of the chassis; and an electric motor mounted below the battery enclosure and between a front side of the rear chassis and a front end of the electric vehicle.

Example embodiment 82: The electric vehicle of example embodiment 81, wherein the electric motor is positioned generally horizontally relative to the transmission.

Example embodiment 83: The electric vehicle of example embodiment 81, wherein a transmission drive shaft and a motor drive shaft are spaced apart along a longitudinal axis of the electric vehicle.

Example embodiment 84: The electric vehicle of example embodiment 81, wherein the rear portion of the chassis is a rear tunnel and the front portion of the chassis is a front brace structure, wherein a transmission plate attached to the electric motor is connected at a first end to the rear tunnel and at a second end to the front brace structure.

Example embodiment 85: The electric vehicle of example embodiment 81, wherein the electric vehicle is a snowmobile.

Example embodiment 86: A snowmobile, comprising: a chassis that comprises a rear tunnel; a battery enclosure mounted to the rear tunnel; and an electric motor mounted below the battery enclosure and adjacent to a front side of the rear tunnel.

Example embodiment 87: The snowmobile of example embodiment 86, wherein the chassis further defines a mid-bay and a front brace structure, the mid-bay being located between the rear tunnel and the front brace structure, wherein the electric motor is positioned within the mid-bay.

Example embodiment 88: The snowmobile of example embodiment 87, wherein the mid-bay comprises a transmission plate positioned substantially parallel to a first side edge of the rear tunnel.

Example embodiment 89: The snowmobile of example embodiment 88, wherein the transmission plate is attached at a first end to the first side edge of the rear tunnel and at a second end to a component of the front brace structure.

Example embodiment 90: The snowmobile of example embodiment 89, wherein the transmission plate is further attached to a front plate of the electric motor.

Example embodiment 91: The snowmobile of example embodiment 90, further comprising a transmission, wherein the electric motor is mounted proximate to the transmission by the transmission plate.

Example embodiment 92: The snowmobile of example embodiment 91, wherein the transmission plate includes a U-shaped opening that extends downwards from a top side of the transmission plate, and wherein the electric motor is attached to both sides of the U-shaped opening such that a drive shaft of the electric motor extends through the U-shaped opening.

Example embodiment 93: The snowmobile of example embodiment 89, wherein the component of the front brace structure is mounted to an underside of the battery enclosure and to the transmission plate.

Example embodiment 94: The snowmobile of example embodiment 91, wherein the electric motor includes an electric motor drive gear and the transmission includes a transmission gear, and wherein a drive belt is connected between the electric motor drive gear and the transmission gear such that an angle of a top portion of the drive belt between the electric motor drive gear and the transmission gear with respect to a substantially horizontal longitudinal axis of the snowmobile is equal to or less than 20% and equal to or greater than −20%.

Example embodiment 95: The snowmobile of example embodiment 89, further comprising a drive belt idler pulley that contacts a bottom surface of the bottom portion of the drive belt, and wherein the top portion of the drive belt is connected directly between the electric motor drive gear and the transmission gear.

Example embodiment 96: An electric snowmobile, comprising: a transmission mounted within an interior of a rear tunnel of the snowmobile and proximate to a rear suspension of a track of the snowmobile; a battery enclosure mounted to the rear tunnel; and an electric motor mounted below the battery enclosure and between a front side of the rear tunnel and a front end of the snowmobile.

Example embodiment 97: The electric snowmobile of example embodiment 96, further comprising a transmission, wherein the electric motor is mounted directly to the transmission by a transmission plate, and wherein the transmission plate is mounted to the rear tunnel of the snowmobile.

Example embodiment 98: The electric snowmobile of example embodiment 97, wherein the transmission plate includes a U-shaped opening that extends downwards from a top side of the transmission plate, and wherein the electric motor is attached to the transmission plate at an interior of the transmission plate such that a drive shaft of the electric motor extends through from the interior to an exterior of the U-shaped opening of the transmission plate.

Example embodiment 99: The electric snowmobile of example embodiment 97, wherein the electric motor includes an electric motor drive gear and the transmission includes a transmission gear, and wherein a drive belt is connected between the electric motor drive gear and the transmission gear such that an angle of a top portion of the drive belt between the electric motor drive gear and the transmission gear with respect to a substantially horizontal longitudinal axis of the snowmobile is equal to or less that 20% and equal to or greater than −20%.

The invention claimed is:

1. An electric vehicle, comprising:
a suspension system;
a seat on which a rider of the electric vehicle may sit;
a steering system;
an electric motor;
a battery pack, the battery pack comprising:
one or more battery modules to provide power to the electric motor; and a battery enclosure housing the one or more battery modules, the battery enclosure being a structural element of the electric vehicle to receive loads from at least two of the suspension system, the seat and the steering system; and
a chassis, the battery enclosure to transfer the received loads, at least partially, to the chassis, the chassis including a rear tunnel, the battery enclosure connected to the rear tunnel to transfer the received loads, at least partially, to the rear tunnel.

2. The electric vehicle of claim 1, wherein the battery enclosure defines a front portion and a rear portion, the front portion to receive loads from at least one of the suspension system and the steering system and the rear portion to receive loads from at least the seat.

3. The electric vehicle of claim 1, wherein the electric vehicle comprises a chassis comprising a front brace structure connected to the suspension system, the battery enclosure connected to the front brace structure to receive loads from the front brace structure.

4. The electric vehicle of claim 3, wherein multiple different surfaces of the battery enclosure are connected to the front brace structure.

5. The electric vehicle of claim 3, wherein the suspension assembly comprises a shock absorber connected to the front brace structure.

6. The electric vehicle of claim 1, wherein the battery enclosure is connected to the steering system to receive loads from the steering system.

7. The electric vehicle of claim 1, wherein the electric vehicle is a snowmobile.

8. A battery enclosure for an electric vehicle, the battery enclosure housing one or more battery modules and being a structural element of the electric vehicle, the battery enclosure comprising:
a rear portion for connection to a rear portion of a chassis of the electric vehicle, the rear portion of the battery enclosure configured to receive loads from a seat on which a rider of the electric vehicle may sit; and
a front portion for connection to a front portion of the chassis of the electric vehicle, the front portion of the battery enclosure configured to receive loads from a front suspension of the electric vehicle;
the battery enclosure to transfer received loads, at least partially to the chassis, the battery enclosure to connect to a rear tunnel of the chassis to transfer received loads, at least partially, to the rear tunnel.

9. The battery enclosure of claim 8, wherein the battery enclosure is configured to transfer loads received from the seat and the front suspension, at least partially, to a chassis of the electric vehicle.

10. The battery enclosure of claim 8, the front portion further to receive loads from a steering system of the electric vehicle.

11. The battery enclosure of claim 8, wherein the battery enclosure comprises a carbon fiber composite material.

12. The battery enclosure of claim 8, wherein the battery enclosure comprises a glass fiber reinforced plastic material.

13. The battery enclosure of claim 8, wherein the battery enclosure has a stiffness that is within a range that is equal to or greater than 10 gigapascal (Gpa) and equal to or less than 70 Gpa.

14. The battery enclosure of claim 8, the battery enclosure housing at least two electric battery modules.

15. The battery enclosure of claim 14, the battery enclosure providing a water-tight housing for the at least two electric battery modules.

16. An electric vehicle, comprising:
a straddle-seat;
a chassis comprising a rear tunnel;
a suspension system; and
a battery enclosure housing one or more battery modules, the battery enclosure configured as a structural element to receive loads from the suspension system, the battery enclosure to transfer the received loads, at least partially, to the chassis, the battery enclosure connected to the rear tunnel to transfer the received loads, at least partially, to the rear tunnel.

17. The electric vehicle of claim 16, the battery enclosure to transfer, at least partially, loads from the suspension system through a body of the battery enclosure to the chassis.

18. The electric vehicle of claim 16, the straddle-seat being mounted directly to the battery enclosure.

19. The electric vehicle of claim 16, wherein the electric vehicle is a snowmobile.

* * * * *